(No Model.)
15 Sheets—Sheet 2.
W. B. DWIGHT.
MACHINE FOR CUTTING OR SLICING MINERALS.
No. 445,983.  Patented Feb. 10, 1891.
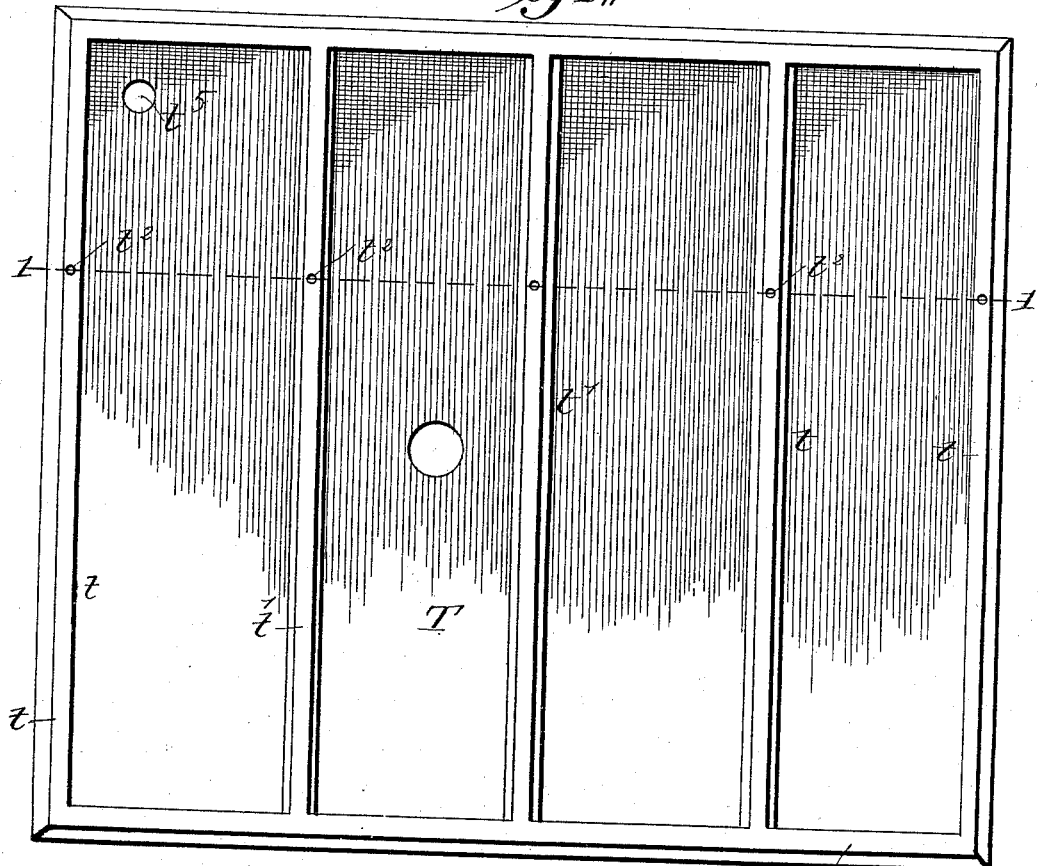
Fig. 1ᵃ.
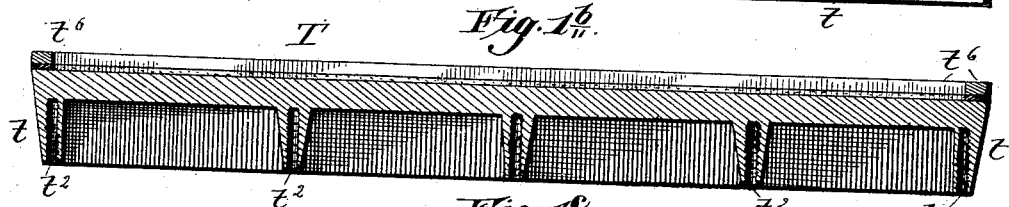
Fig. 1ᵇ.
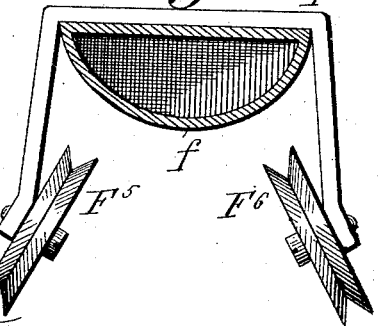
Fig. 1ᶜ.
Witnesses:
Henry E. Dieterich
B. W. Sommers.
Inventor.
Wm. B. Dwight.
per Henry Orth
Attorney.

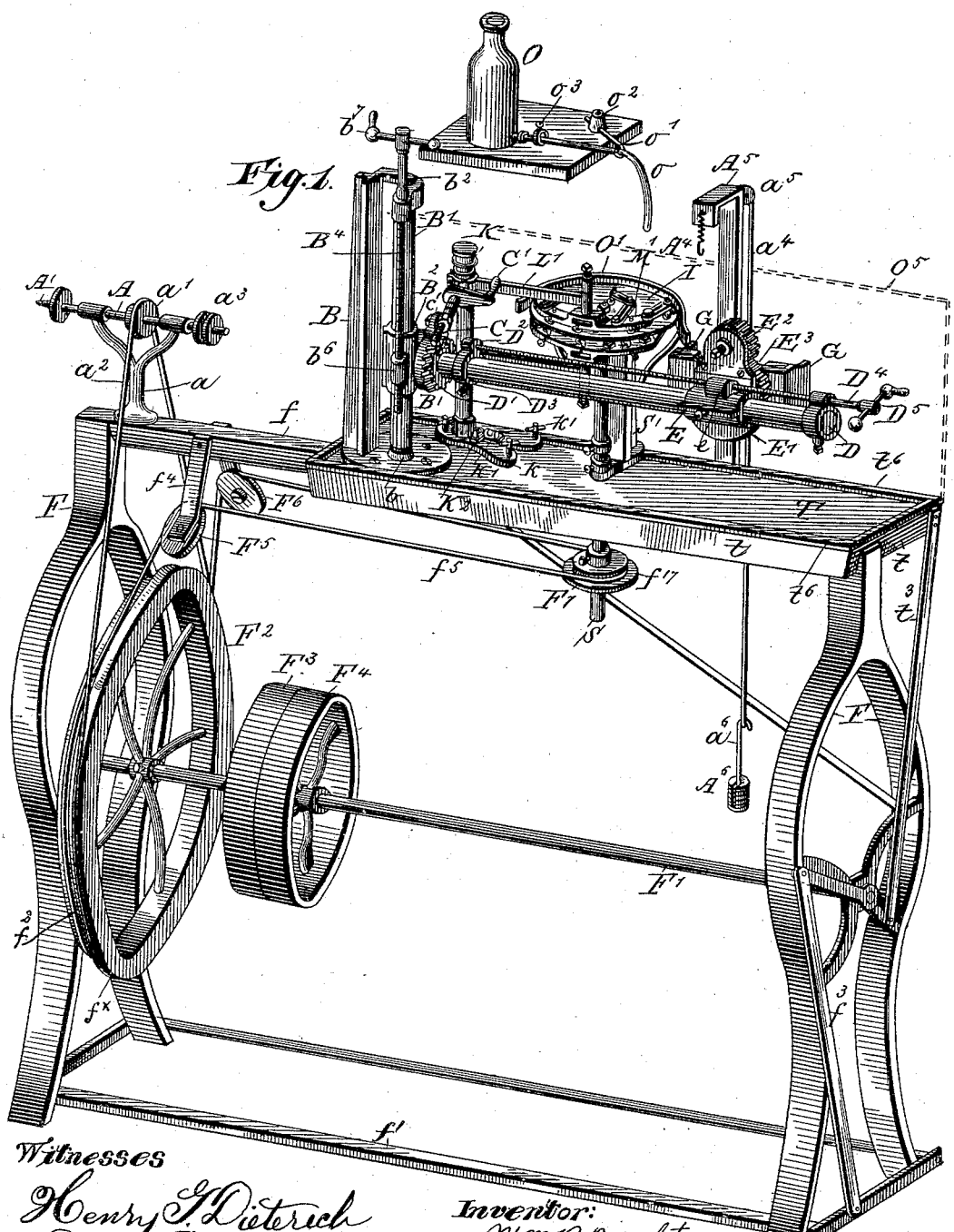

(No Model.)  15 Sheets—Sheet 3.
W. B. DWIGHT.
MACHINE FOR CUTTING OR SLICING MINERALS.
No. 445,983.  Patented Feb. 10, 1891.
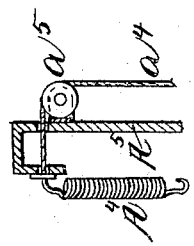
Fig. 1ª.
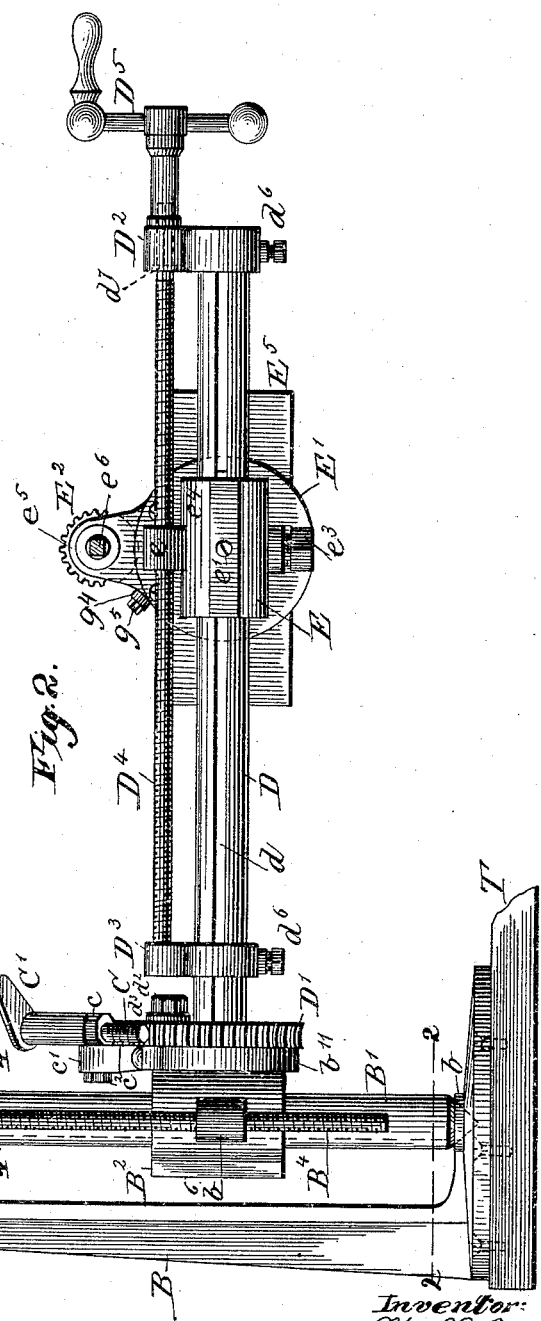
Fig. 2.
Witnesses:
Henry T. Dieterich
B. W. Sommers.
Inventor:
Wm. B. Dwight,
per Henry Orth
Attorney.

(No Model.) 15 Sheets—Sheet 4.
W. B. DWIGHT.
MACHINE FOR CUTTING OR SLICING MINERALS.
No. 445,983. Patented Feb. 10, 1891.
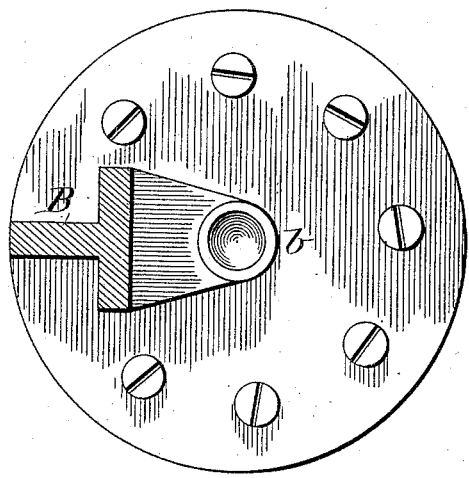
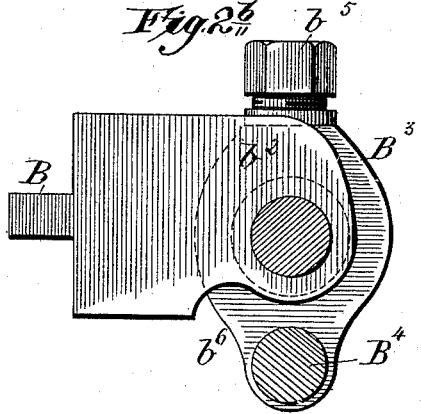
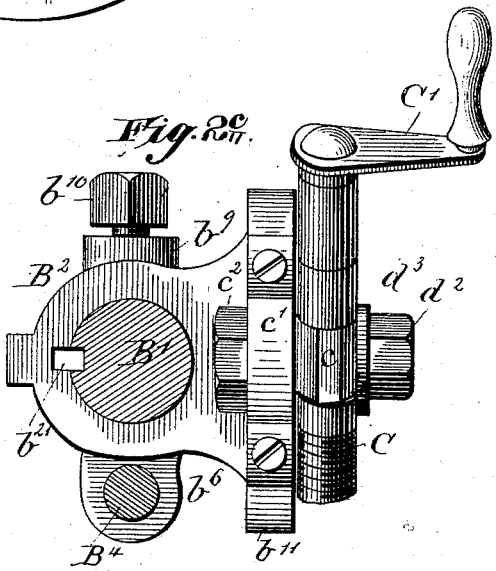
Witnesses:
Henry T. Dieterich
B. W. Sommers
Inventor:
Wm. B. Dwight.
per Henry Ort.
Attorney.

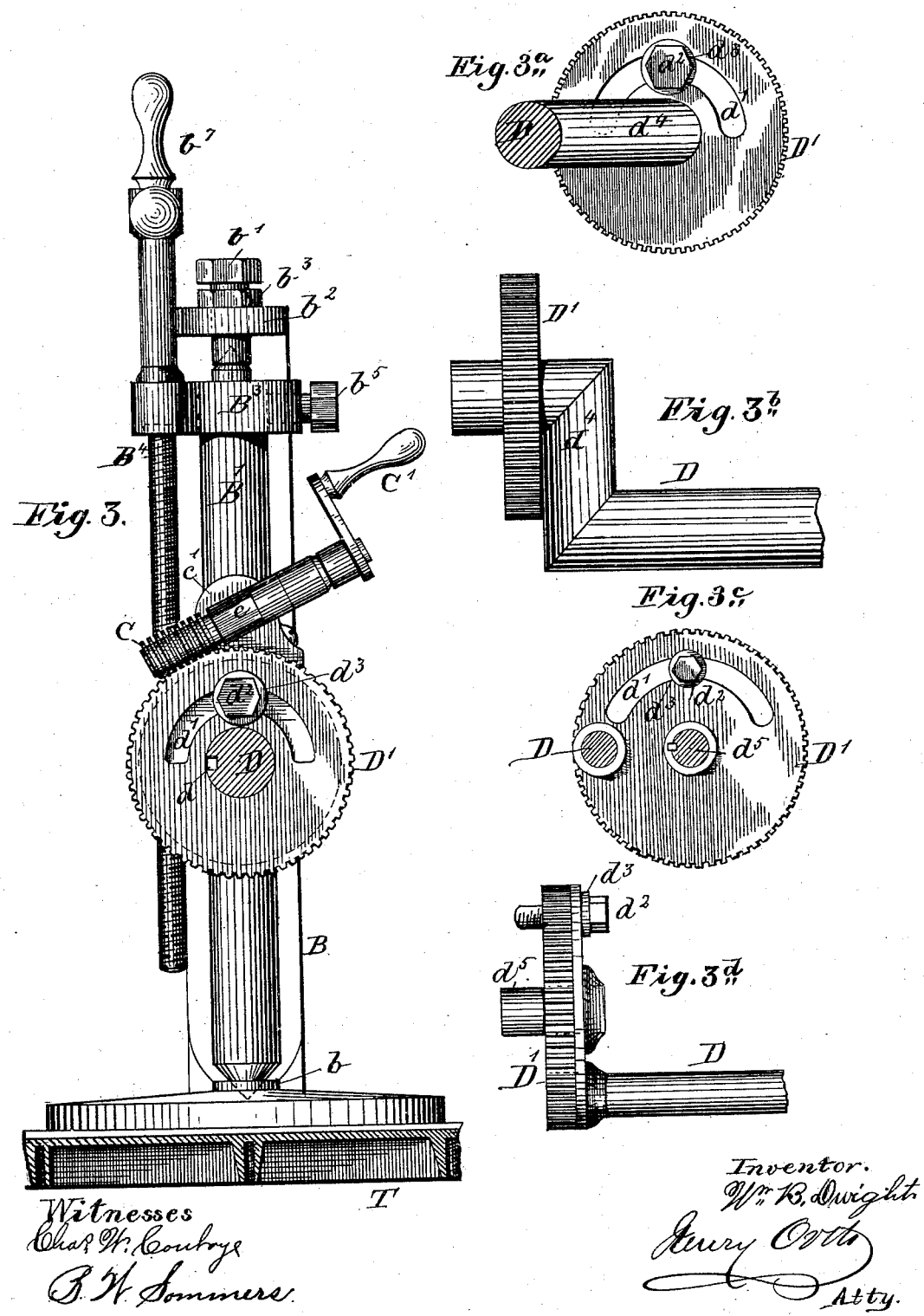

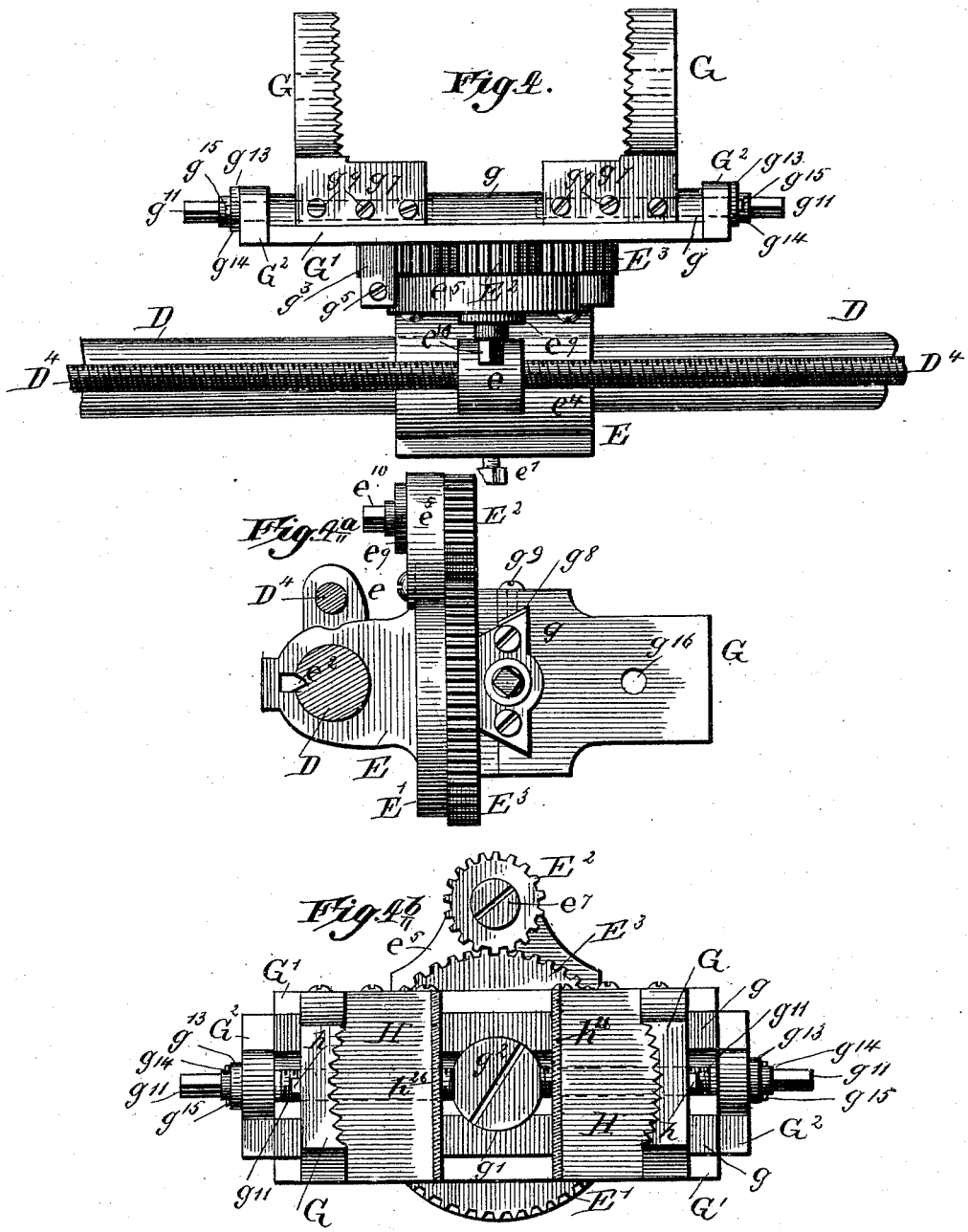

(No Model.) 15 Sheets—Sheet 7.
W. B. DWIGHT.
MACHINE FOR CUTTING OR SLICING MINERALS.
No. 445,983. Patented Feb. 10, 1891.
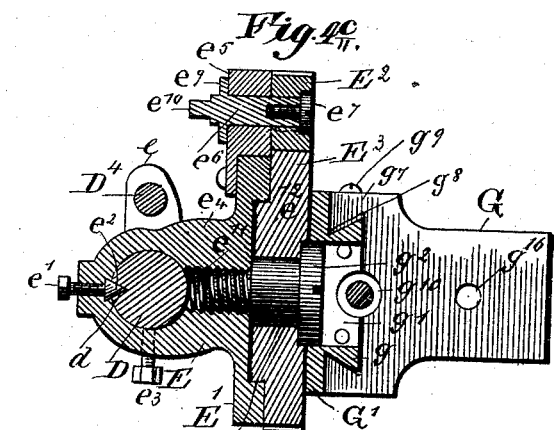
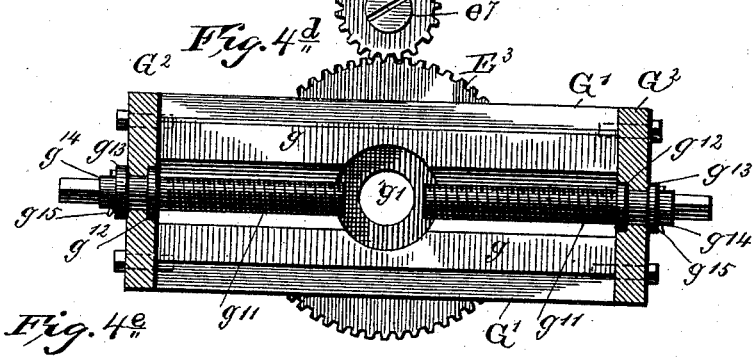
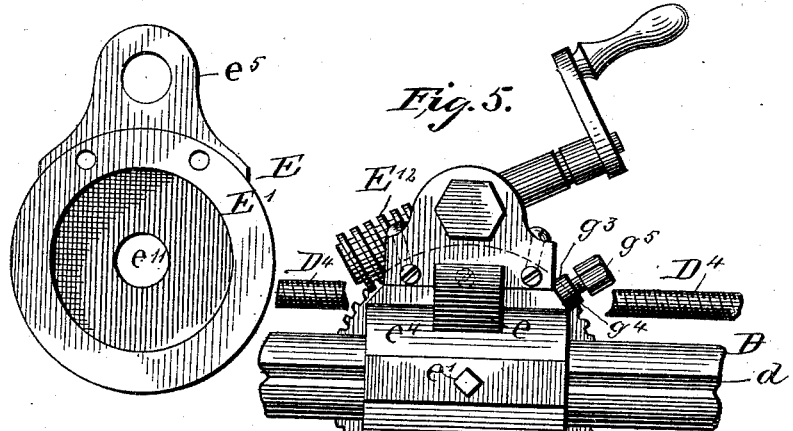
Witnesses
Henry T. Dieterich
B. H. Sommers
Inventor.
Wm. B. Dwight.
Henry Orth
Atty.

(No Model.) 15 Sheets—Sheet 8.
W. B. DWIGHT.
MACHINE FOR CUTTING OR SLICING MINERALS.
No. 445,983. Patented Feb. 10, 1891.
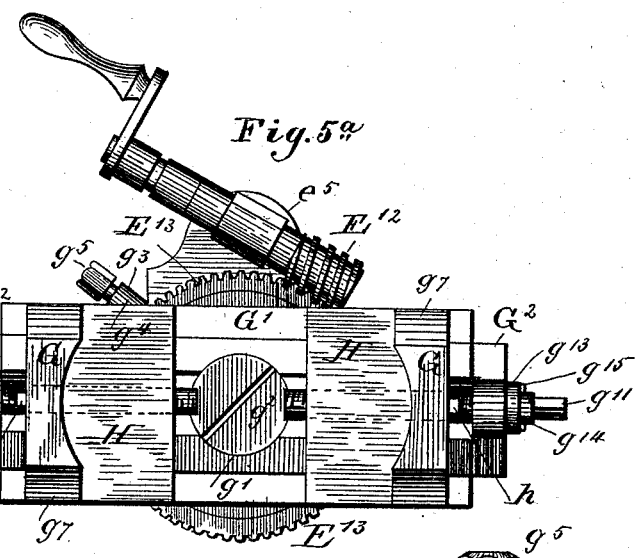
Fig. 5ª
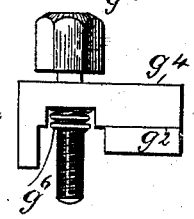
Fig. 5ᶜ
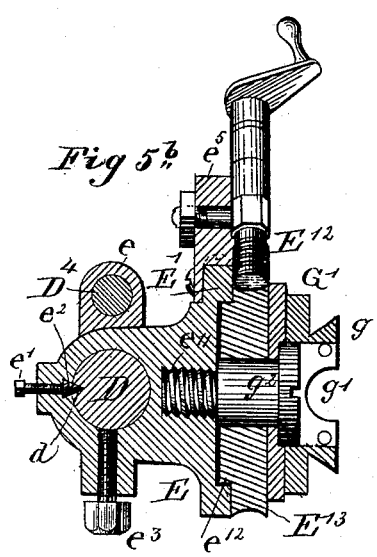
Fig. 5ᵇ
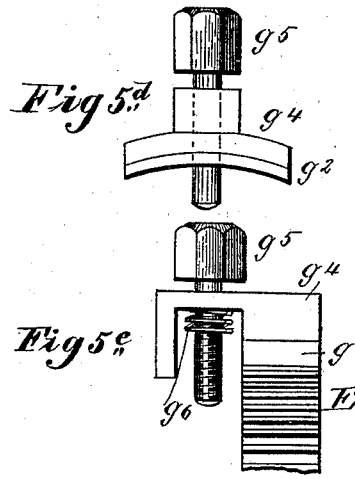
Fig. 5ᵈ
Fig. 5ᵉ
Witnesses
Chas. H. Conboys
B. W. Sommers
Inventor.
Wm. B. Dwight
Henry Orth
Atty.

(No Model.) 15 Sheets—Sheet 9.
W. B. DWIGHT.
MACHINE FOR CUTTING OR SLICING MINERALS.
No. 445,983. Patented Feb. 10, 1891.
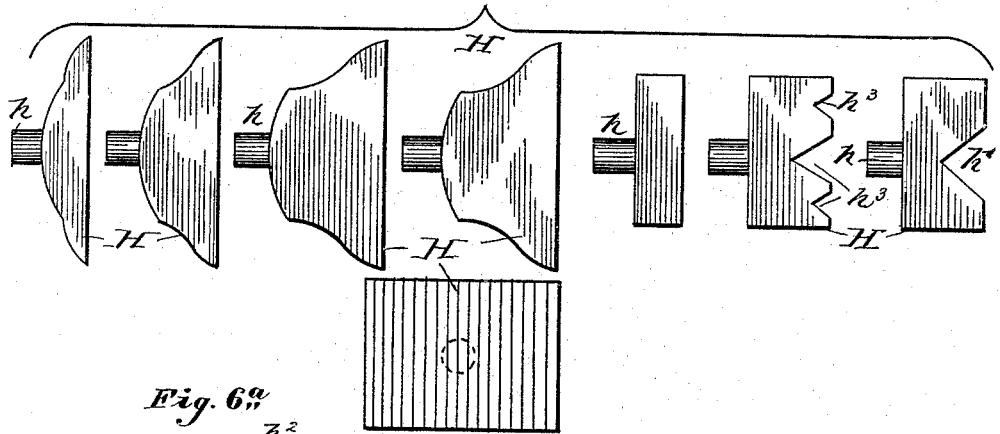
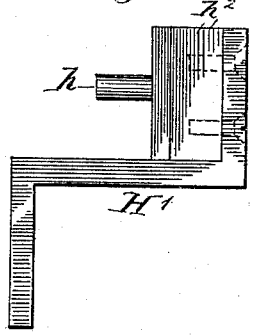
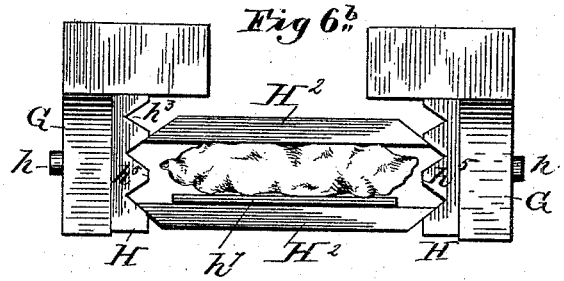
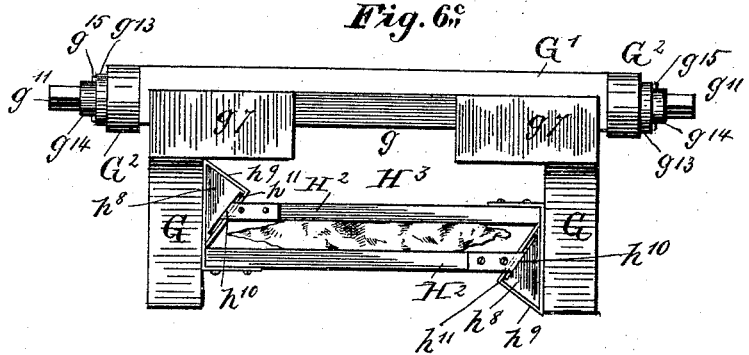
Witnesses:
Chas. W. Coubrye
B. H. Sommers
Inventor.
Wm. B. Dwight
Henry Orth
Atty.

(No Model.) 15 Sheets—Sheet 10.
W. B. DWIGHT.
MACHINE FOR CUTTING OR SLICING MINERALS.
No. 445,983. Patented Feb. 10, 1891.
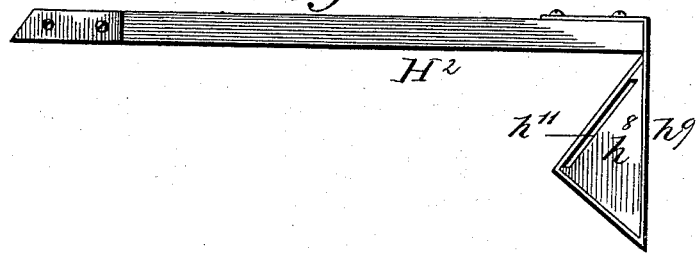
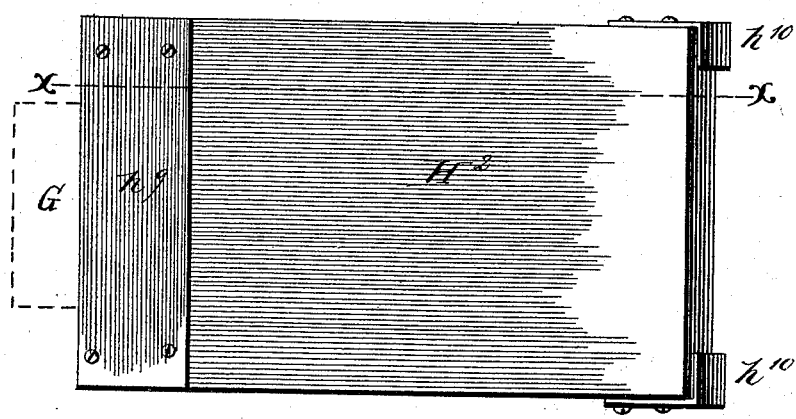
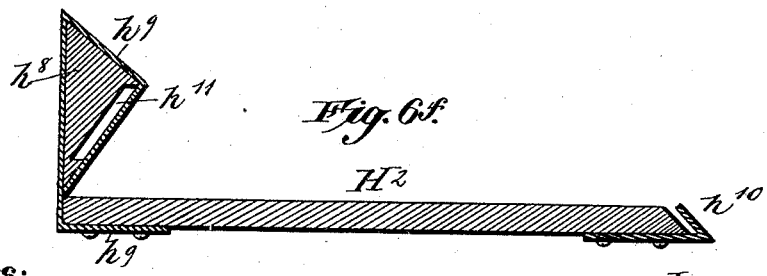
Witnesses:
Henry T. Dieterich
B. W. Sommers.
Inventor:
Wm. B. Dwight
per Henry Orth
Attorney.

(No Model.) 15 Sheets—Sheet 11.
W. B. DWIGHT.
MACHINE FOR CUTTING OR SLICING MINERALS.
No. 445,983. Patented Feb. 10, 1891.
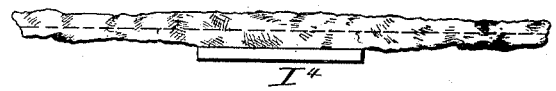
Fig. 7.ᵉ
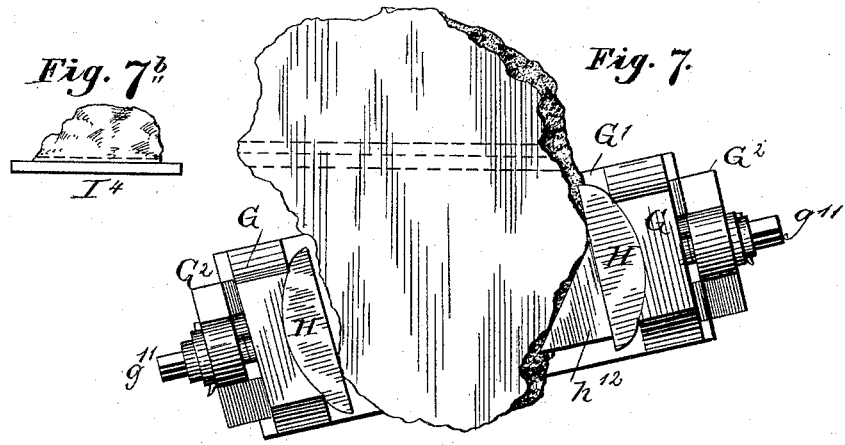
Fig. 7.ᵇ Fig. 7.
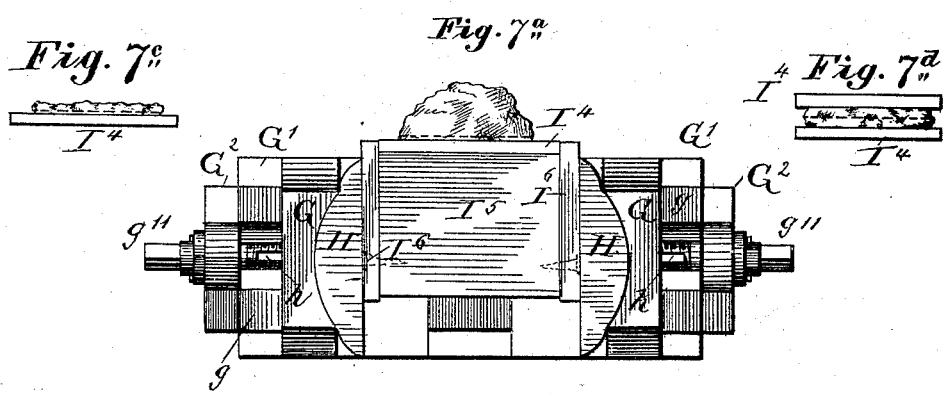
Fig. 7.ᶜ Fig. 7.ᵃ 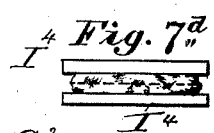 Fig. 7.ᵈ
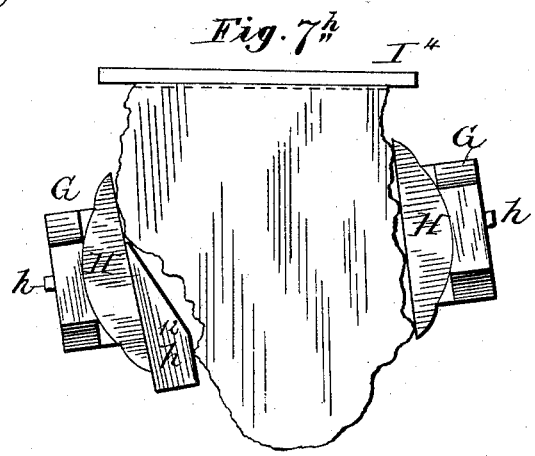
Fig. 7.ʰ
Witnesses.
Chas. W. Coutoye
B. W. Sommers
Inventor.
Wm. B. Dwight.
per Henry Orth
Atty.

(No Model.) 15 Sheets—Sheet 12.
W. B. DWIGHT.
MACHINE FOR CUTTING OR SLICING MINERALS.
No. 445,983. Patented Feb. 10, 1891.
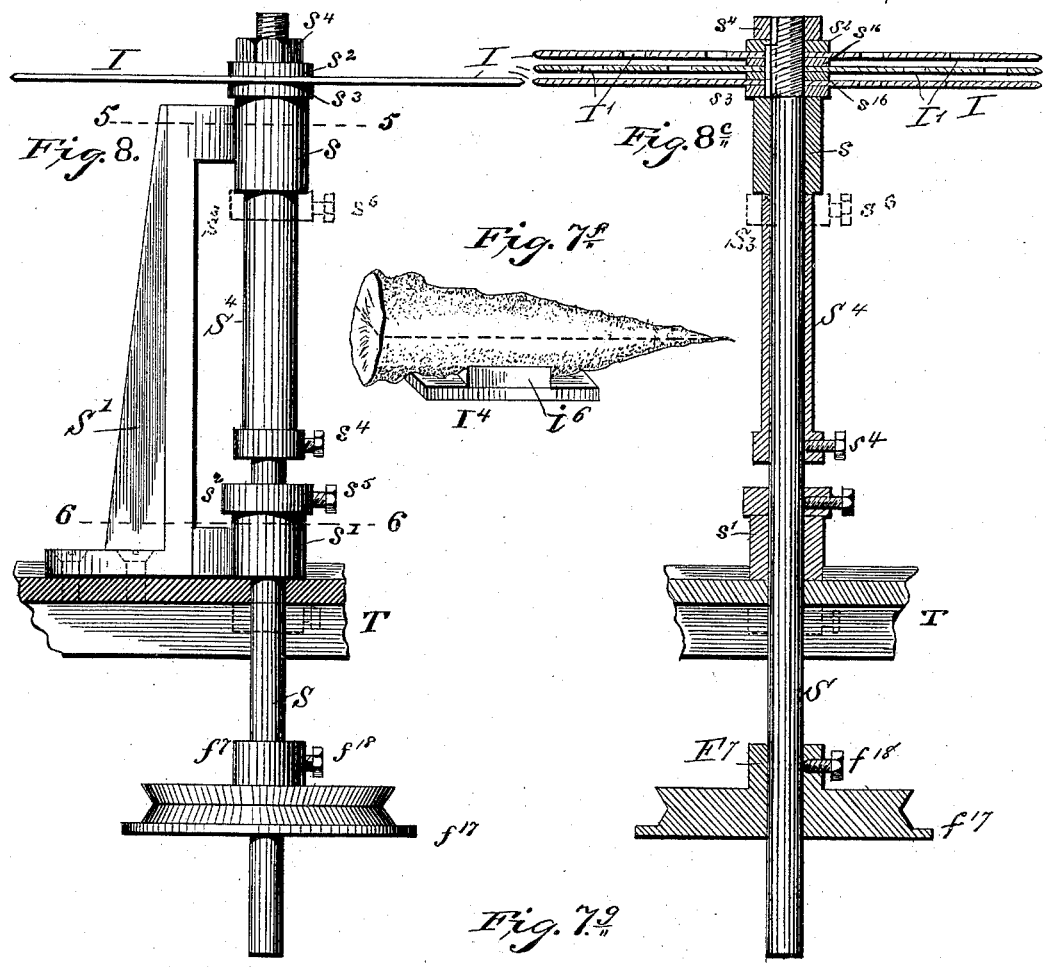
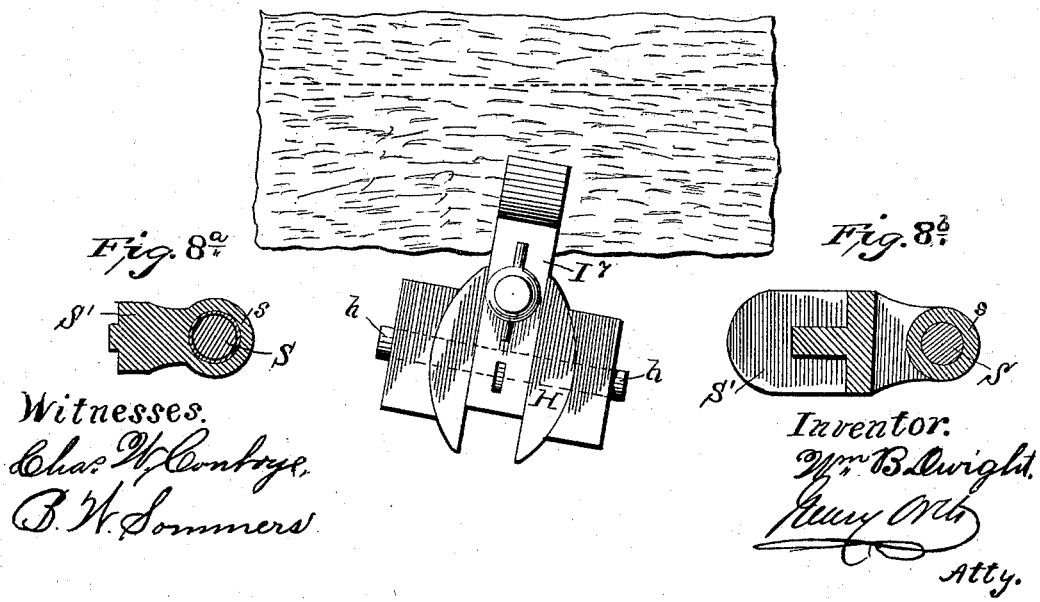
Witnesses.
Chas. W. Contrye
B. W. Sommers
Inventor.
Wm. B. Dwight
Henry Orth
Atty.

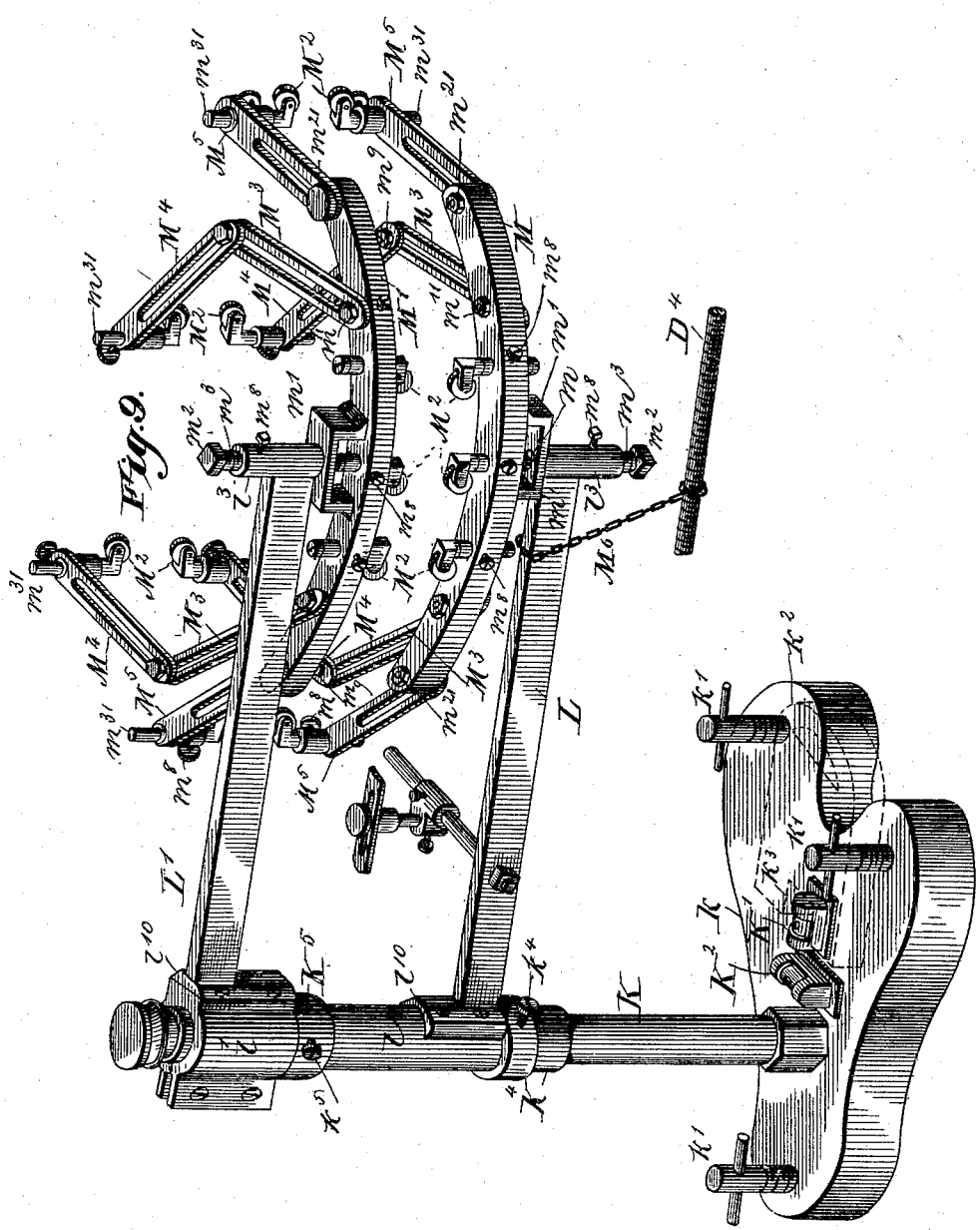

(No Model.) 15 Sheets—Sheet 14.
W. B. DWIGHT.
MACHINE FOR CUTTING OR SLICING MINERALS.
No. 445,983. Patented Feb. 10, 1891.
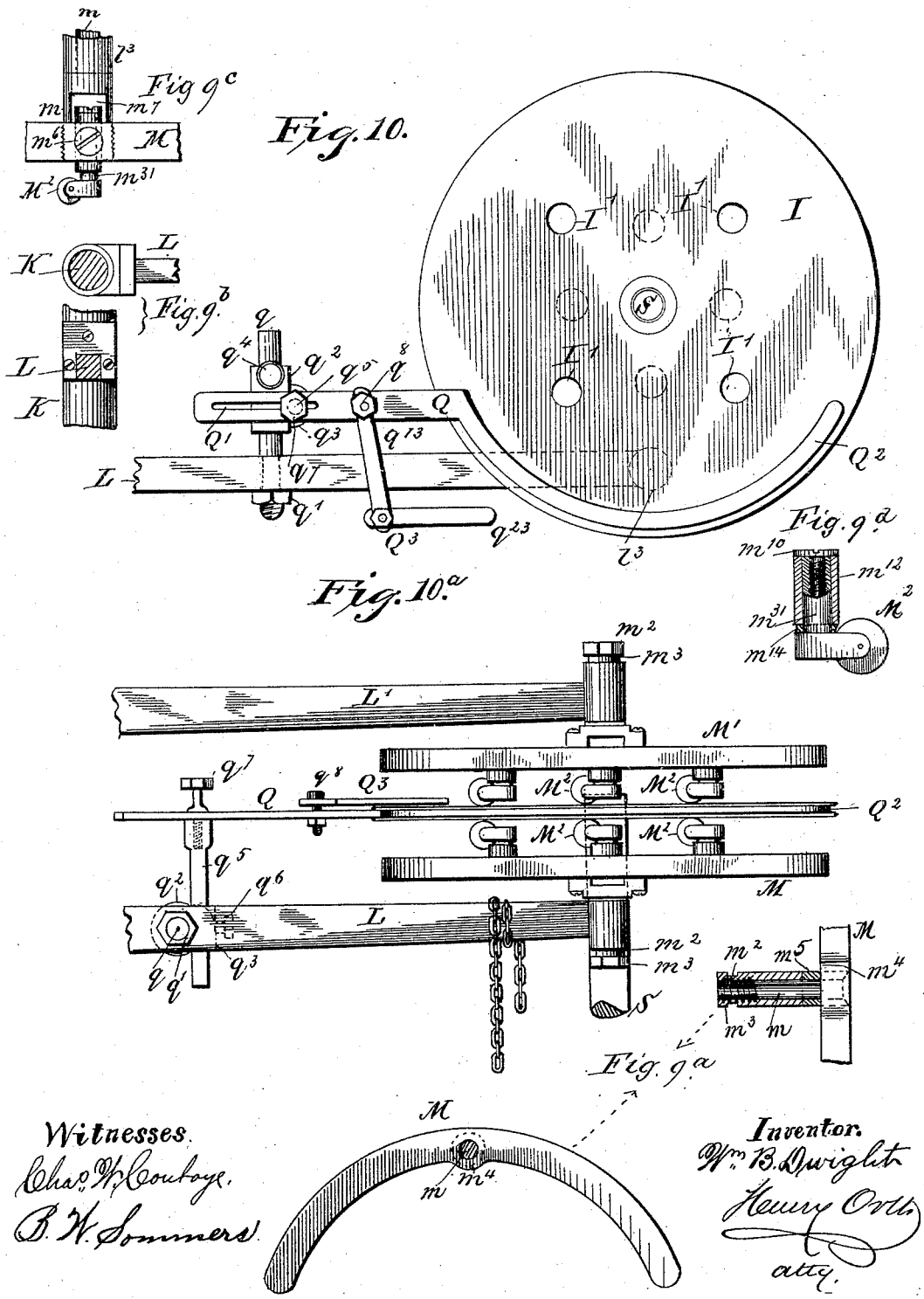
Witnesses
Chas. W. Coutoys.
B. W. Sommers
Inventor.
Wm. B. Dwight
Henry Orth
atty.

(No Model.) 15 Sheets—Sheet 15.
W. B. DWIGHT.
MACHINE FOR CUTTING OR SLICING MINERALS.
No. 445,983. Patented Feb. 10, 1891.
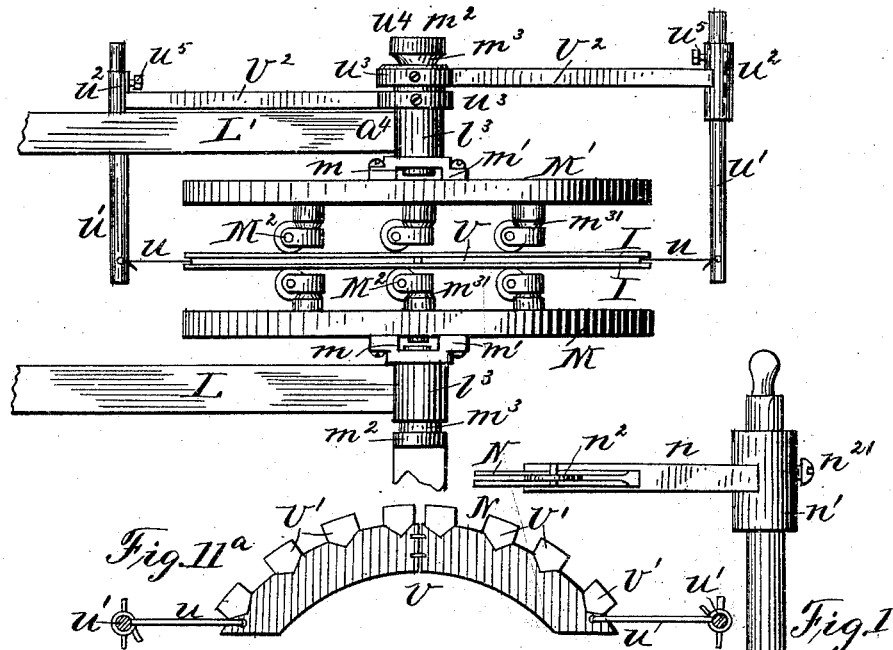
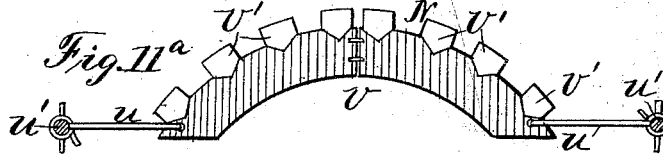
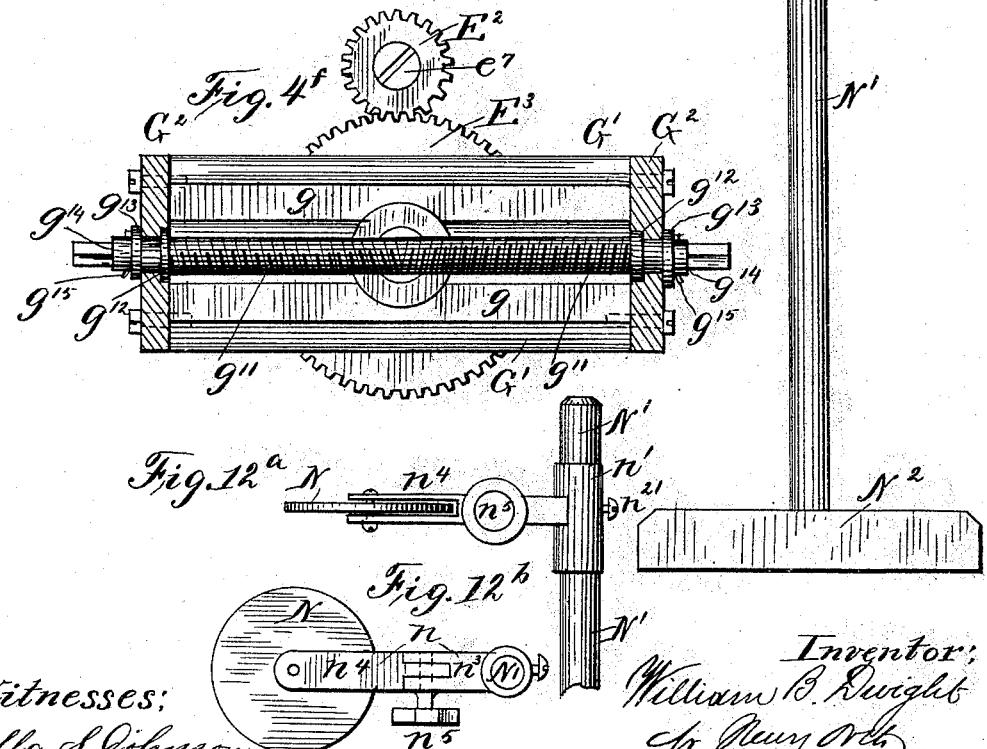
Witnesses:
Ella S. Johnson
B. W. Sommers
Inventor:
William B. Dwight
Atty.

United States Patent Office.

WILLIAM B. DWIGHT, OF POUGHKEEPSIE, NEW YORK.

MACHINE FOR CUTTING OR SLICING MINERALS.

SPECIFICATION forming part of Letters Patent No. 445,983, dated February 10, 1891.

Application filed September 18, 1890. Serial No. 365,321. (No model.)

*To all whom it may concern:*

Be it known that I, WILLIAM B. DWIGHT, professor of natural history, Vassar College, a citizen of the United States, residing at Poughkeepsie, in the county of Dutchess and State of New York, have invented certain new and useful Improvements in Machines for Cutting and Slicing Minerals; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates, broadly or generally speaking, to machines or apparatus for cutting or sawing stone, though the machine or apparatus hereinafter to be described is more especially designed for more delicate and accurate work than that done by the ordinary stone sawing or cutting machine.

Notwithstanding the fact that the machine which forms the subject-matter of this invention is more especially designed, as stated, for delicate and accurate work, yet it embodies improvements that are applicable generally to stone sawing or cutting machines, as well as to machines for cutting other substances in which discoidal cutters are employed either singly or in a gang.

The invention has for its object a machine or apparatus for sawing or cutting minerals and other hard substances into comparatively thin slabs or tablets for mosaic or similar work, as well as for educational and scientific purposes; to which ends the invention consists in structural features and in the combination of co-operative elements and mechanism, as will now be fully described, reference being had to the accompanying drawings, in which like letters indicate like parts wherever such may occur in the various figures.

Figure 1 is a general perspective view of an apparatus or machine for sectioning hard substances, illustrating as many of the co-operative mechanisms and other elements as is possible and consistent with clearness. Such elements or accessories as cannot be illustrated in this view or as cannot be illustrated with sufficient clearness will be clearly illustrated by detail and special views. Fig. 1$^a$ is an under side view of the table of the apparatus. Fig. 1$^b$ is a section thereof, taken on line 1 1 of Fig. 1$^a$. Fig. 1$^c$ is a section of the lathe-bed, illustrating the bracket-bearing for the guide-pulleys for the driving-belt; and Fig. 1$^d$ is a sectional detail view of the upper part of the standard A$^5$ shown in Fig. 1. Fig. 2 is a front elevation of the work-holder, the support therefor, and the adjusting mechanism. Figs. 2$^a$, 2$^b$, and 2$^c$ are sections taken, respectively, on lines 2 2, 3 3, and 4 of Fig. 2, the standard B' being omitted in Fig. 2$^a$. Fig. 3 is a right-hand elevation of the adjusting mechanism for the support of the work-holder, which latter is shown in section. Figs. 3$^a$ and 3$^b$ show by a face view and side elevation, respectively, a modified construction of the support for the work-holder. Figs. 3$^c$ and 3$^d$ are views similar to Figs. 3$^a$ and 3$^b$, illustrating a modification in the means for connecting the work-holder support with its adjustable carrier. Fig. 4 is a top plan view of the work-holder, the carriage, the means for adjusting the clamping-jaws of the work-holder and a portion of the support therefor, and of the screw for adjusting said work-holder longitudinally on the support. Fig. 4$^a$ is an end elevation of the work-holder and its carriage, the support for said holder and the screw for adjusting the same longitudinally on its support being shown in section. Fig. 4$^b$ is a rear elevation of the work-holder. Fig. 4$^c$ is a vertical transverse section of the work-holder, its carriage, the support therefor, and the adjusting-screw. Fig. 4$^d$ is a rear elevation of the work-holder, the clamping-jaws being removed. Fig. 4$^e$ is a rear elevation of the carriage for the work-holder; and Fig. 4$^f$, Sheet 15, is a view similar to Fig. 4$^d$, showing a single right and left hand threaded adjusting-screw for the clamping-jaws. Figs. 5, 5$^a$, and 5$^b$ show the work-holder and its carriage by a front and rear elevation and a central transverse sectional view, respectively, in conjunction with a modified adjusting-gearing for revolving the work-holder on its carriage; and Figs. 5$^c$, 5$^d$, and 5$^e$ are detail views of the brake for said gearing. Fig. 6 shows by end views various forms of auxiliary jaws. Fig. 6$^a$ is a top view of an auxiliary clamping-jaw for objects too large to be clamped in the jaws of the work-holder. Figs. 6$^b$ and 6$^c$ are top plan views of parallel horizontal clamps combined with toothed auxiliary clamps, and Figs. 6$^d$, 6$^e$, and 6$^f$ are detail views of the clamping-frame shown in Fig. 6$^c$. Figs. 7, 7$^a$, 7$^b$, 7$^c$, 7$^d$, 7$^e$, 7$^f$, 7$^g$, and 7$^h$ show further means for securing substances of irregular form to the work-holder. Fig. 8 is an elevation of the cutter-spindle and means for supporting the same; and Figs. 8$^a$ and 8$^b$ are sections taken, respectively, on lines 5 5 and 6 6 of Fig. 8; and Fig. 8$^c$ is a sectional view of the cutter-spindle carrying a plurality of cutters. Fig. 9 is a perspective view of one form of cutter leveling and guiding device, of which Figs. 9$^a$, 9$^b$, 9$^c$, and 9$^d$ are detail views. Fig. 10 is a top view of the cutter and leveling and guiding devices adapted for use with a gang of cutters, and Fig. 10$^a$ is a front elevation thereof. Fig. 11 is a like view showing a modified construction of the leveling and guide arm. Fig. 11$^a$ is a top view of the guide-arm. Figs. 12 and 12$^a$ are elevations of a rim-guide for use with a single cutter or a gang of such, respectively; and Fig. 12$^b$ is a top plan view of the rim-guide shown in Fig. 12$^a$.

The machine or apparatus which I am about to describe being more particularly designed for very accurate as well as very delicate work, such as the cutting of extremely thin strips, slabs, or tablets for microscopic study or for mounting as specimens for mineral cabinets or collections for educational institutions or museums, it will be understood that the various mechanisms, as well as the auxiliary devices, are constructed with that care and exactitude which is necessary to accurate operation, and which is generally found in scientific instruments or instruments of precision. It will, however, be understood that I do not limit myself to such a machine or apparatus, as the general improvements made are applicable to machines for coarser yet accurate work for various other purposes than those referred to.

Referring now more particularly to Figs. 1, 1$^a$, 1$^b$, and 1$^c$, F indicates the frame of the machine, which in general construction is that of an ordinary lathe-frame, of which $f$ is the bed-plate, and $f'$ the treadle connected by rod $f^3$ to the driving-shaft F′, that carries the driving-pulley F$^2$, which is constructed so as have at least two portions or sections of different diameter in which the belt or cord grooves $f^2 f^\times$ are formed. The driving-shaft F′ also carries a fast and loose belt-pulley F$^3$ F$^4$, respectively, so as to adapt said shaft to be belted to and driven from any suitable prime motor instead of being driven from the treadle $f'$.

To the bed-plate $f$ of the frame is secured a bracket $f^4$, in the pendent arms of which are formed the bearings for the journals of two grooved pulleys or sheaves F$^5$ F$^6$, and F$^7$ is the grooved pulley or sheave on the end of the vertical cutter-spindle S, driven by driving-wheel F$^2$ through the medium of a cord or belt $f^5$, that passes around the wheel F$^2$ in the groove $f^2$ of the section or portion of least diameter, thence around the front guide-pulley F$^5$ to and around pulley F$^7$ on spindle S, and from the last-named pulley around the guide-pulley F$^6$ and back to the groove $f^2$ of the driving-wheel F$^2$.

From the left end of the bed $f$ of the frame F projects a standard $a$, in the arms of which are formed the bearings for a horizontal spindle A, to which is secured a belt-pulley $a'$, adapted to be belted to the driving-wheel F$^2$, the belt or cord $a^2$ lying in the groove $f^\times$ of that portion of the wheel which is of the greatest diameter. The spindle A is provided with a taper screw A′ and carries disks of felt $a^3$ or of analogous or equivalent material for polishing emery-wheels—a necessary accessory to a machine of this class—and when the cutter spindle or spindles are driven by foot-power the belt $a^2$ will be found of greatest convenience in starting the driving-shaft F′. The driving-wheel F$^2$ should be sufficiently heavy to act as a fly-wheel, though, if desired, such a wheel may be provided and mounted on the shaft F′ at any desired or convenient point, especially if the machine is driven by a power other than the treadle.

To the bed-plate $f$ of the frame is secured a table T of such dimensions as to be capable of accommodating all the necessary cooperative mechanisms, and for convenience of access to the treadle $f'$ and other mechanisms the said table is secured to the bed-plate $f$ so as to project but little beyond its front edge. This table T is of cast metal, its upper face being planed perfectly true and smooth, and is secured to the bed-plate so as to be perfectly level. The table T has depending edges or marginal flanges $t$, and on its under side is provided with transverse strengthening-ribs $t'$, said edge or marginal flanges $t$ and transverse ribs $t'$ being provided with interiorly-threaded sockets $t^2$ for the reception of screw-bolts, by means of which said table is secured to the bed $f$ of the frame. To better sustain the weight of the rearwardly-projecting portion of the table a suitable brace or braces $t^3$ may be secured thereto and to one or both of the legs of the frame, as shown in Fig. 1.

To the upper face of the table are secured marginal strips $t^6$, that are made fluid-tight by any desired means, so as to retain the lubricant used and dropping onto the table, which at its rear left corner is provided with a hole $t^5$, Fig. 1$^a$, for drawing off the lubricant or for allowing the same to flow off into a suitable receptacle, and also for the purpose of removing the detritus resulting from the cutting of mineral and other hard substances.

When the apparatus is used for less delicate or less accurate work, the table T, with its upwardly and downwardly projecting edge or marginal flanges and cross-ribs, may be cast in one piece.

I will now describe the mechanism by means of which the support for the work-holder is adjusted vertically relatively to the cutter or cutters and by means of which said support may be revolved on its axis or in a circular plane, referring to Figs. 1, 2, $2^a$, $2^b$, $2^c$, and 3.

At the left end of the table T is secured a standard B, the base-plate of which is provided with a step $b$ for the lower cone end of a vertical cylindrical steel bar B', whose upper cone end has its bearing in a conical recess formed in the end of a binding or set screw $b'$, that works in a screw-threaded opening formed in the upper horizontal arm $b^2$ of standard B, said screw being held against accidental rotation by a jam or lock nut $b^3$, Figs. 2 and 3, thus providing means for taking up wear of the cone-bearings of the bar B', as well as for securing the same against rotation in its bearings. The said bar has a longitudinal key-groove $b^{21}$, Fig. $2^c$, for the reception of a key, spline, or feather $b^4$, that serves to lock a sleeve $B^2$ against rotation on bar B' without interfering with the vertical motion of said sleeve on the bar. At its upper end, below the horizontal arm $b^2$ of the standard B, the bar B' carries a collar $B^3$, secured to said bar by means of a set-screw $b^5$, Figs. $2^c$ and 3. In the said collar is formed an opening for the passage of a vertical adjusting-screw $B^4$, that works in a screw-threaded bearing $b^6$, formed on the sleeve $B^2$, Figs. 2 and $2^c$, and is revolved by means of a ball-handle $b^7$, secured to its upper end, Figs. 2 and 3, or by means of a hand-wheel, the screw being provided with an abutment or flange $b^8$, (shown in dotted lines in Fig. 2,) that seats in a corresponding recess in the under side of the collar $B^3$ and holds the said screw against endwise motion in the collar. For the purposes for which the apparatus under consideration is designed the screw $B^4$ should have not less than thirteen (13) threads to the inch. The sleeve $B^2$ has an interiorly-threaded bearing $b^9$, Fig. $2^c$, for a set-screw $b^{10}$, by means of which it may be locked against vertical motion on the bar B' after being adjusted in order to relieve the adjusting-screw $B^4$ of the weight of said sleeve and the devices supported thereby, which weight is considerable, especially when comparatively large pieces or blocks of mineral or of other hard substances are to be cut, and which would speedily wear away the threads of said screw. On the other hand, the set-screw $b^{10}$ may not be brought into use when the substance to be cut is small and light; yet I preferably lock the sleeve-bearing to the bar in all cases, for the reason that there is always more or less vibration of the parts, due to the motion of the revoluble elements of the apparatus, which vibration or jarring is apt to displace the adjusting-screw, and thereby change the position of the sleeve $B^2$.

In the cutting of minerals or other hard substances, especially if of irregular form, it is of great advantage—in fact, it is almost absolutely necessary—to be able to present the substance to the cutter in the most advantageous manner in order to obtain specimen slabs, tablets, or strips that will show the structure or composition of the substance to the best advantage. This cannot always be effected by a mere vertical adjustment of the work-holder and its support relatively to the cutter, for which purpose the mechanism just described is designed, the support for the work-holder being connected with the sleeve $B^2$.

In order to accomplish the most desirable results, I provide means whereby the support for the work-holder may be revolved about its axis or adjusted in a circular plane, and these means I will now describe, again referring to said Figs. 1, 2, $2^c$, 3, and $3^a$, and thereafter the means for adjusting the work-holder longitudinally on its support. The sleeve $B^2$ has on its right side a disk or cylindrical boss $b^{11}$, to the periphery of which is secured by means of screws or bolts a bearing $c'$ for the journal or trunnion projecting from one side of a bearing $c$, in which works a worm C, that is revolved by means of a handle C'. The journal of the bearing $c$ is screw-threaded at its outer end, and is secured in its bearing $c'$ by means of the nut $c^2$, Figs. 2 and $2^c$, so that by loosening said nut the worm-bearing $c$ and the worm-screw C may be swung out of gear with the worm-wheel D', when the support for the work-holder may be revolved by hand to expedite the adjustment of said work-holder.

In the sleeve $B^2$, centrally of the cylindrical boss $b^{11}$ and extending nearly to the bore of said sleeve, is formed a horizontal bearing for the left end of the work-holder support. This support consists of a cylindrical steel bar D, whose left end fits snugly into the horizontal bearing formed in the sleeve $B^2$. The bar D has a longitudinal key-groove $d$, which may be rectangular in cross-section for the reception of a like key, spline, or feather on the work-holder carriage, or said groove may be V-shaped in cross-section for the reception of a like guide and locking-dog on said carriage, as hereinafter referred to. At said left end the work-holder support D carries the worm-wheel D', above referred to, in which is formed a segmental slot $d'$, Fig. 3, through which extends a locking or set screw $d^2$, that screws into a hole in the face of the cylindrical boss $b^{11}$ of the bearing-sleeve $B^2$ for the purpose of locking the support D and the worm-wheel D' against rotation after being adjusted. As shown in Fig. 3, the slot $d'$ in the worm-wheel admits of one-half of a revolution of the support D in either direction, so that the amplitude of circular adjustment is more than sufficient for all purposes, and of course it will be understood that the slot is a segment of a circle whose center is the axis of the support D. To more effectually lock the wheel D' to the bearing $B^2$ a washer $d^3$ is interposed between the head of the screw and the outer face of the worm-wheel. For the purpose for which the apparatus is more particularly designed the worm C and the worm-wheel D' should have a thread sufficiently fine to admit of a very delicate adjustment of the support D.

If heavy substances are to be cut, in order to bring the weight thereof nearer to the center of rotation, the support D may be provided with a crank $d^4$, Figs. $3^a$ and $3^b$, or the worm-wheel D' may be provided with a journal $d^5$, adapted to fit the horizontal bearing in the sleeve $B^2$, and the support D may be secured eccentrically to the said worm-wheel D', as shown in Figs. $3^c$ and $3^d$. In the last-named construction the thickness of the worm-wheel may be considerably increased in order to give it the necessary strength to support the bar D and the elements carried thereby. Inasmuch, however, as the support D is detachably connected with the bearing-sleeve $B^2$, the several supports D, suited to the nature of the work to be done, may be interchangeably connected with said bearing, the diameters of the various worm-wheels being of course the same, though even this may vary within the limits of adjustment of the worm C in its bearing $c$. On the other hand, for very heavy work the support D may be braced at any convenient point either by a brace on the table or a hanger suspended from a fixed support above the apparatus, either of which should be adjustable.

For the purpose of adjusting the work-holder along its support D, the latter carries the collars $D^2 D^3$, adapted to be rigidly connected with said support by means of set-screws $d^6$, and each of said collars has a bearing for the opposite ends of a horizontal adjusting-screw $D^4$, that carries at its outer end a ball-handle or hand-wheel $D^5$, which should be sufficiently remote from the collar $D^2$ to admit of its manipulation when the work-holder is at the extreme limit of its movement to the right.

If desired, the stem of the handle or hand-wheel may be provided with a squared socket adapted to fit upon a squared outer portion of the screw $D^4$, so that it may be removed from the adjusting-screw $D^4$ when not in use, as shown in dotted lines in Fig. 2. The screw $D^4$ has also an abutment or collar $d^7$, that fits into a recess in the left face of the collar $D^2$ to hold the said screw against endwise motion. The screw $D^4$ works in an interiorly-threaded lug $e$ on the back of the slide or carriage E for the work-holder, and said screw, like screw $B^4$, should have not less than thirteen (13) threads to the inch. For light work the collar $D^3$, that supports the left end of the screw $D^4$, may be dispensed with, as the collar $D^2$ and the lug on carriage E will hold said screw sufficiently steady for the purposes of adjustment of said carriage on the support D. It will be observed that both collars $D^2$ and $D^3$ are detachable from the support D for the convenience of dismembering the parts. It is obvious, however, that these collars could form an integral part of the support D.

To avoid the necessity of moving the support D for the work-holder by hand to the cutter as the cutting proceeds, I employ a spring $A^4$, that has a hook at one end adapted to be hooked to the adjusting-screw $D^4$. The opposite end of the spring is attached to a cord $a^4$, that passes over a pulley $a^5$ on a standard $A^5$, the free end of the cord being attached to a rod $a^6$, adapted to carry a weight or weights $A^6$, thus providing a feeding device adapted to hold the substance to be cut to the cutter with a yielding pressure. The cord $a^4$ may, if desired, be attached to a lever carrying a weight adapted to be adjusted thereon toward and from the lever-fulcrum for the purpose of regulating the tension of the spring.

I will now describe the construction of the work-holder and its carriage, as well as the construction and arrangement of the means for connecting the same with and revolving it on its carriage, the interchangeable clamping-jaws of the work-holder, the means for connecting the same to the jaws of said work-holder, and the mechanism for adjusting the clamping-jaws on the carriage relatively to the object to be held thereto, as well as adjuncts for more securely holding said object between the jaws, reference being had to Figs. 1 and 2, and to Figs. 4 to $7^g$.

As hereinabove described, the carriage E is held against rotary motion on the support D by a key, spline, or feather, which may be of rectangular form in cross-section. It is desirable, however, that means other than the screw $D^4$ should be provided for locking the work-holder carriage into the position to which it is adjusted on its support with a view to relieving the threads of the screw from any strain due to vibration. To this end I preferably provide the support D with a guide-groove $d$, that is V-shaped in cross-section, and I employ a set-screw $e'$, that has a correspondingly-shaped head $e^2$ at its end, Fig. $4^c$, or the said set-screw may bear upon a key inserted into and of the shape of the groove. By this means the carriage E is not only properly guided on the support D, but can be locked thereto, and the wear of the parts taken up to keep the carriage steady in its movements. In practice, however, I prefer to employ an additional binding or set screw $e^3$, Figs. 2, $4^c$, 5, and $5^b$, for locking the carriage to the support D. The carriage E consists, essentially, of a cylindrical portion E', on the rear face of which is formed a tubular or sleeve bearing $e^4$, through which passes the support D, and on said sleeve $e^4$ is formed the interiorly-threaded bearing $e$, in which works the adjusting-screw $D^4$, as shown in Figs. 2, 4, $4^a$, $4^c$, 5, and $5^b$.

On the periphery of the cylindrical portion E' is formed or secured a plate $e^5$, in which is formed a bearing for the journal $e^6$ of a pinion $E^2$, which journal may or may not form an integral part of the pinion, and may be secured in its bearing so as to revolve freely therein in any well-known or desired manner. It is desirable, however, that these parts should be so constructed as to be readily removed and as to provide for the taking up of wear, and to this end I preferably construct the parts as follows and as shown in Fig. 4ᶜ: The pinion E² has an axial opening and in its front face an annular recess formed around said opening for the reception of the head of a locking-screw $e^7$, that screws into an axial opening of a journal $e^6$, provided at its rear end with an abutment or locking-flange $e^9$ and with a squared extension $e^{10}$ for the purpose of holding the journal against rotation in its bearing while the screw is manipulated and to revolve the pinion for adjusting the jaws, said journal being provided with a spline, key, or feather to lock the pinion E² against rotation.

In an apparatus of the kind under consideration the work-holder should be of such a construction as to receive and firmly hold substances whatever their form and texture, and in this class of apparatus great difficulties—in fact, insurmountable difficulties—have heretofore been encountered in securing small and fragile specimens or specimens of loose texture or of little tenuity with sufficient firmness in the work-holder for sectioning the same; nor has it been possible with the means at hand in apparatus as heretofore constructed to secure substances of irregular form in the most advantageous position for sectioning the same, as it frequently happens that a substance can be held in the work-holder in only one or two positions in order to admit of a firm prehension of the clamping devices without crushing the substance or its edges, while either of these positions may be impracticable or disadvantageous in the cutting of sections therefrom in a desired plane.

The want of proper means for holding substances of irregular form in the most desirable and advantageous position for obtaining sections thereof—as, for instance, a thin slab to be cut parallel with its face, or more or less cylindrical or conoidal bodies to be bisected in the plane of the longest axis of such bodies—entails losses in material as well as tedious labor, as such bodies have heretofore been presented to the cutters by hand, if not too small, or secured in an ordinary carpenter's or joiner's clamp held by hand to the cutters, so that a perfectly true section could not be obtained. The devices which I am about to describe are designed to obviate these difficulties and provide means whereby bodies of almost every form, texture, and dimensions within certain limits may be firmly held in the work-holder in the most desirable or advantageous position for sectioning the same.

The work-holder is composed of two jaws G G, that are adapted to slide on ways $g$, formed on a supporting-plate G', Figs. 4, 4ᵃ, 4ᵇ, 4ᶜ, 4ᵈ, 5ᵃ, and 5ᵇ, whose length determines the extent to which the jaws G may be moved from each other. This plate G' is secured to a gear-wheel E³, that is in gear with pinion E², above referred to, said gear-wheel E³ being mounted on a journal secured to the carriage E. In order to detachably connect these parts for the purpose of substituting clamping-jaws of greater or less range of motion toward and from each other for securing therein larger and smaller objects, the wheel E has an axial opening and in its front face an annular recess formed around said opening that registers with a corresponding opening $g'$ in the supporting-plate G' of the work-holder for the reception of the head of its journal $g^2$, the end of which is screw-threaded and screws into an axial opening $e^{11}$, formed in the cylindrical portion E' of the carriage E. In order to give greater steadiness to the work-holder in its revolving movements and to more firmly connect it with the carriage E, the wheel E³ has on its front face a cylindrical boss $e^{12}$, formed around its axial aperture, which boss fits into a corresponding recess formed in the front face of the cylindrical boss E' of carriage E, Fig. 4ᶜ. It is obvious that when the pinion E² is rotated the work-holder will be revolved in an opposite direction, thus providing an additional and important adjustment to present the object operated upon in the most desirable position to the cutter or cutters, and important also in adjusting the work-holder to the plane of the cutter. As shown in Fig. 4ᶜ, the journal $g^2$ for the wheel E³ is of such a length as to project slightly beyond the face of the cylindrical boss $e^{12}$ of the wheel E³, so that said wheel cannot be rigidly locked to the carriage. By the means described the work-holder may be adjusted with fair precision by revolving it on its axis; but when very delicate work is to be done which requires a very delicate adjustment I prefer to employ worm-gearing instead of the ordinary gearing above described, as shown in Figs. 5, 5ᵃ, and 5ᵇ, the pinion E² being here replaced by a worm E¹² and the wheel E³ by a worm-wheel E¹³, the worm being secured to its bearing in the manner as described in reference to the worm C, Figs. 2, 2ᶜ, and 3, and needs, therefore, no further description.

In either form of adjusting-gearing it is necessary that means be provided to lock said gearing against rotation after the work-holder has been adjusted. To this end I employ a brake-shoe $g^3$, Figs. 4, 5, 5ᵃ, 5ᶜ, 5ᵈ, and 5ᵉ. This brake-shoe consists of a block of brass or other suitable material, the under face of which is of curvilinear form to fit the periphery of the wheel E³ or that part of the worm-wheel E¹³, and is secured to or forms part of a rectangular bracket $g^4$, the pendent arm of which extends over the front face of the cylindrical boss E' of the carriage E, to the periphery of which boss the bracket is secured by means of an adjusting-screw $g^5$, so that by screwing said screw in or out of the said cylindrical boss of the carriage the brake-shoe may be applied to or disengaged from the wheel, a spiral spring $g^6$ being interposed between the bracket and its support to promptly lift the said bracket and brake off the wheel when the screw $g^5$ is revolved in the proper direction. If desired, the shoe may be faced with felt, rubber, leather, or similar material. It is of importance, however, that the brake-shoe be so arranged as that the pressure will be exerted thereby exactly in the direction of the radii of the wheel; otherwise there will be more or less motion imparted to said wheel whenever the brake is applied, which would destroy the adjustment of the work-holder.

The clamping-jaws G (see Fig. 4) are provided each with a foot-plate $g^7$, that has a slot corresponding to the outline of the ways $g$ on plate G' and should accurately fit the said ways and move thereon smoothly. In order that the precision of fit and motion may be preserved by taking up the wear of the parts, I interpose between the outer wall of one of the ways $g$ and one of the walls of the slot in the foot-plate $g^7$ of the jaw G a thin washer $g^8$, Figs. $4^a$ and $4^c$, that is appressed against the said way by means of set-screws $g^9$. The foot-plates $g^7$ of the clamping-jaws G of the work-holder are each provided with an interiorly-screw-threaded bearing $g^{10}$, in which work the adjusting-screws $g^{11}$, by means of which the jaws are adjusted to and from each other, said bearing fitting in a suitable recess formed in the ways $g$ of plate G'. The adjusting-screws $g^{11}$ have their bearings in plates $G^2$, bolted to the opposite ends of the supporting-plate G', said screws having a flange $g^{12}$, that abuts against the inner face of the plates $G^2$, and a loose collar $g^{13}$, that bears against the outer face of said plates and is held in position by a collar $g^{14}$ and a key $g^{15}$, the outer ends of the screws being squared for the application of a key, as shown in Figs. 4, $4^a$, $4^b$, $4^d$, and $5^a$.

Instead of two adjusting-screws $g^{11}$, a right and left handed screw may be employed, extending through the correspondingly-threaded bearings $g^{10}$ of the jaws G, so that the adjustment of the said jaws may be effected simultaneously. Either of these means may be resorted to, and each of them has advantages and disadvantages. The disadvantage in the use of two adjusting-screws lies in the fact that both screws have to be manipulated in adjusting the jaws, which is not the case in the use of the right and left handed screw. On the other hand, when specimens of considerable length are to be cut the substance may be brought more completely to the cutter or cutters by moving the same to one or the other side of the axis of rotation of their supporting-plate, which cannot be done when a single right and left hand threaded adjusting-screw is used. The construction of the parts is, however, such that either two adjusting-screws or a right and left threaded single adjusting-screw may be interchangeably used whenever this is desired, since the several elements that constitute the work-holder and the adjusting devices—namely, the plate G' and jaws G and screws $g^{11}$—are detachably connected together and to the carriage E, so that either one or the other of the described adjusting-screws may be applied in a few minutes.

The proximate faces of the steel jaws G are or may be concaved or partly concaved to better grasp the object between them, and, as shown in Figs. 4 and $4^b$, said faces are preferably corrugated or ribbed vertically to afford a still better hold on the object. Inasmuch as the substances to be cut not only vary greatly as far as outline is concerned, but also in their texture, some substances being very brittle, others soft, while still others have but little tenuity and crumble readily, it is necessary, in order to adapt the apparatus to the cutting of a great variety of substances, that means should be provided for properly and firmly holding the same to the action of the cutter or cutters, as hereinbefore intimated. To these ends I employ auxiliary clamping-jaws H, that are provided with a dowel or pin $h$, adapted to fit a hole $g^{16}$ in the steel jaw G, so as to readily attach the same to and detach the same from said steel jaws. These auxiliary jaws are made of a softer material than steel—such as a soft metal, or preferably of wood—and when constructed of wood and as shown at $h^{26}$, Fig. $4^b$, they may be faced with rubber or felt or like material, so as to better hold the substance without crushing the same. On the other hand, there is another advantage in the use of these auxiliary jaws H, in that the steel jaws G may be kept wide open for small as well as larger bodies, and when smaller bodies are to be clamped therein auxiliary jaws H of the proper thickness can be inserted, so that the adjustment of the steel jaws G will be a comparatively limited one whether large or small bodies are to be clamped in the work-holder.

The auxiliary jaws H have a convex back that fits into the concavity of the steel jaws G, and the clamping-face of said auxiliary jaws is preferably made broader than that of the said steel jaws G to afford a greater area of contact between said face and the substance clamped between said auxiliary jaws H, as shown in Figs. $5^a$, 7, and $7^a$, and also to admit of a greater amplitude of rotation to present the substance at a greater angle to the cutter when the specimen is to be cut at a greater or less angle to the longer axis of the substance. The contact-faces of the auxiliary jaws H may also differ in their form. They may be plain and smooth or roughened, or they may be provided with teeth or with a single V-shaped tranverse notch, as shown at $h'$ and $h^3$, respectively, in Fig. 6, or said faces may be of other irregular form.

The wooden auxiliary jaws H should be saturated with oil to prevent absorption of the water used as a lubricant for the cutter or cutters and to prevent the dowel $h$ from swelling, thereby rendering it difficult to remove the said jaws from the steel jaws, and the dowel is preferably made of such a length as to project slightly beyond the back of the steel jaws, (see Figs. 5ª, 7, and 7ª,) so that they may be readily removed by a tap with a hammer or mallet.

In view of the great variety in the form of mineral specimens to be cut and their size, which may be such as to render it impossible to clamp them firmly between the steel jaws G, I provide auxiliary jaws for securing bodies that cannot be secured in the steel jaws G of the work-holder. The means last referred to consist of a block $h^2$ of an auxiliary clamping-jaw H, to which is secured the Z-shaped clamping-jaw H', Fig. 6ª, the block $h^2$, if such is used, being also provided with a dowel $h$ for connection with the steel jaws G. When the object to be cut is long and comparatively thin and has more or less beveled or wedge-shaped edges, I employ auxiliary clamping-jaws having serrated clamping-faces, in combination with parallel longitudinal clamping-jaws $H^2$. As shown in Fig. 6ᵇ, the auxiliary clamping-jaw H has its clamping-face serrated or provided with a V-shaped transverse groove $h^3$, Fig. 6, or with a plurality of such forming-teeth $h^5$, Fig. 6ᵇ, and in conjunction therewith I employ parallel clamps $H^2$, having their opposite ends beveled, as shown at $h^6$, Fig. 6ᵇ, the object or specimen being placed between the parallel clamps $H^2$, which should of course be longer than said specimen, and the inclined faces of said clamps placed against the like faces of the teeth $h^5$ of the auxiliary clamps H. It is obvious that if the jaws G of the work-holder are moved together the parallel clamps $H^2$ will likewise be moved together, but in a direction at right angles to the motion of the jaws G and H, thus clamping the object firmly between them, as plainly shown in Fig. 6ᵇ. The parallel clamps $H^2$ are preferably made of wood, as they are more especially designed for clamping fragile objects or plates that would readily be crushed by the steel jaws G or by the auxiliary jaws H, and said parallel clamps $H^2$ are preferably made of a greater width than the steel jaws G, as shown in Fig. 6ᶜ, in which one of the jaws G is shown in dotted lines on the left. In order to properly adjust the parallel clamps $H^2$ relatively to the inclined faces of the teeth $h^5$ of the auxiliary jaws H, one or more strips of card-board $h^7$, Fig. 6ᵇ, may be used between the object or substance and one or both of said parallel clamps $H^2$.

Instead of the parallel clamps just described, a clamping-frame $H^3$, Fig. 6ᶜ, may be used. This frame consists of two parallel clamps $H^2$, of wood, of a length slightly less than the greatest span between the steel jaws G of the work-holder. One end of the parallel clamps $H^2$ is beveled or inclined upwardly at an angle of about thirty degrees, the other end being square and having secured or hinged thereto a triangular block or wedge. This wedge is formed by securing a strip of sheet metal $h^9$ to the upper and under sides, respectively, at the squared end of and to the two parallel clamps $H^2$, then bending the sheet metal into the form of a V or right-angled triangle, with the longer inclined face of the angle in the direction of the length of said parallel clamps, and securing in the triangular space thus formed a correspondingly-shaped block of wood $h^8$; or the said sheet-metal plate may be bent completely around the block $h^8$, as shown in Fig. 6ᶜ. If this frame is inserted between the clamping-jaws G of the work-holder, with the straight faces of the blocks $h^8$ against the clamping-face of said jaws G and with the inclined faces of said wedges in reverse directions, and the jaws G are moved together, the two parallel jaws will also be moved together by reason of their beveled ends being caused to move from the base toward the apex of the blocks, as plainly shown in Fig. 6ᶜ. This adjustable frame is held together by means of angle-pieces $h^{10}$, constructed of sheet metal, forming hooks that enter recesses $h^{11}$, formed in the inclined side of the angle-blocks $h^8$ under the sheet-metal inclosing case, thus forming an integral frame, the parallel clamping-jaws $H^2$ of which have motion on the inclined faces of the angle-block $h^8$, whereby very fragile substances or substances that have little tenacity and will readily crumble may be firmly held and cut.

In the cutting of very small substances these are preferably cemented to a glass plate $I^4$, Figs. 7ª to 7ᶠ, inclusive, and in order to hold this glass plate firmly between the auxiliary jaws H of the work-holder I provide a block $I^5$, upon which the plate $I^4$ rests, and two clamping-boards $I^6$ at each end, the block $I^5$ being slightly narrower than the glass plate, as shown. The clamping-boards $I^6$ are preferably tacked at one end to the block $I^5$, so as to hold the glass supporting-plate, though this is not necessary. This work-support is used in conjunction with two auxiliary clamping-jaws H, as shown in the figures referred to, which also show various means for securing small objects of different form in the work-holder. For instance, Fig. 7ᶠ shows a substance of a conoidal or horn-like form secured to a saddle $i^6$ on the glass plate $I^4$. In Fig. 7ᵈ I have shown a thin fragile specimen secured between two glass plates $I^4$, the intended line of section being indicated by a dotted line. In Fig. 7 I have shown a filling-wedge $h^{12}$ to increase the area of contact between the substances to be cut and the auxiliary jaws H. In Figs. 7ᵇ, 7ᶜ, and 7ᵉ substances of various forms are shown as secured to glass plates, the intended line of section being shown in dotted lines. On the other hand, bodies too large and too fragile to be clamped between the jaws of the holder or in parallel jaws or a clamping-frame, as above set forth, can be cemented to a glass plate I⁴, Fig. 7ᶜ, and secured by holders I⁵ I⁶ between the jaws G or G H of the work-holder, or such bodies, if in the form of a slab, may be secured to a carpenter's or joiner's clamp I⁷, and said clamp securely clamped in the jaws of the work-holder, as shown in Fig. 7ᵍ.

If it is desired to cut up a specimen into as many very thin or microscopic sections as can be obtained therefrom, and if this cannot be effected by a gang of cutters, the specimen, after cutting a bearing-surface thereon and cementing the same to a glass plate I⁴, is clamped upside down in the work-holder, as shown in Fig. 7ʰ, the leveling being effected on the upper side of the glass plate, as above described, and as each tablet is cut the glass plate is cemented to the cut face of the substance and the work-holder is adjusted vertically relatively to the cutter to cut successive sections of like or unlike thickness, as may be desired, one leveling answering for all the tablets. Of course the glass plate I⁴ must be of equal thickness; otherwise the inequalities will be reproduced in the tablets cut.

The nature and construction of the cutters employed in cutting minerals and other hard substances will necessarily depend upon the nature or structure of the substance to be cut; but all the cutters will be of discoidal form. These cutters will therefore vary, and may be of metal, with smooth serrated or toothed cutting-edges, or they may be emery wheels or disks or diamond-charged cutters.

Although water may be used as a lubricant, this is not desirable, as it will rapidly rust the highly-polished elements of the apparatus, and I preferably use a solution of sodium carbonate, and in cutting large sections oil should be used.

The disk cutters I will not only vary in their character, as above stated, but they will also vary in thickness and diameter, and they are mounted on the vertical spindle or arbor S, Fig. 1, and said spindle is revolubly supported as follows, referring more particularly to Figs. 1, 8, 8ᵃ, 8ᵇ, and 8ᶜ:

In the bed $f$ of frame F and in the table T, supported from said bed, are formed apertures for the passage of the cutter-spindle S, and S′ is a standard that is bolted to table T and has two bearings $s$ and $s'$ for said spindle. The spindle S carries at its lower end below the bed the grooved pulley F⁷, already referred to, said grooved pulley being adjustable on the spindle by means of set-screw $f^{18}$, and, as shown in Fig. 8, said pulley is provided on the lower side of the groove with a peripheral flange $f^{17}$ to prevent the cord or belt from leaving the pulley.

The cutter I is secured to the spindle or arbor S between two collars $s^2$ and $s^3$, the latter of which seats on the sleeve-bearing $s$, the collar $s^3$ being rigidly secured to the spindle and the collar $s^2$ appressed against the cutter by means of a nut $s^4$, so as to clamp the same tightly. On the sleeve-bearing $s'$ rests a stop collar or sleeve S², rigidly connected to the spindle S by the set-screws $s^5$. To prevent the spindle S from moving upwardly in its bearings, a similar collar S³ (shown in Fig. 8) may be connected therewith by means of a set-screw $s^6$. There is, however, a disadvantage in the use of this stop-collar S³ immediately below the sleeve-bearing $s$, in that its greater diameter and the set-screw projecting therefrom will materially reduce the depth of cut of the cutter. To avoid this I interpose between the bearing $s$ and the stop-collar S³ a spacing-sleeve S⁴ of such length as to bring said stop-collar S³ below the plane of support for the substance or object to be cut. On the other hand, the sleeve S⁴ may be dispensed with, and the collar S³ applied to the spindle S so as to bear against the under side of the table, as shown in said Fig. 8.

It will be seen that the spindle S is detachably connected with its bearings and that the driving-pulley F⁷ is adjustable on the said spindle, and in practice I make this spindle of such length as that two or three cutter-disks may be secured thereto, washers or spacing-collars $s^{16}$ being interposed between the cutters and firmly clamped together by means of the nut $s^4$, as shown in Fig. 8ᶜ.

To prevent the rotation of the cutters on the spindle the said spindle may be provided with a feather or key groove for the reception of a key adapted to engage a radial notch formed in the axial opening of the cutter-disks, or the cutters may be provided with a feather adapted to engage a groove in the spindle. As the spindle S can be readily removed, a spindle carrying a gang of cutters is readily substituted for one carrying a single cutter, and vice versa.

By using spacing-collars $s^{16}$ of different thickness tablets or slabs of different thickness may be simultaneously cut from a substance.

In machines of the class under consideration, in which extremely thin strips or tablets of minerals (as thin as one thirty-second of an inch) are cut for microscopic examination, correspondingly thin cutters—namely, cutters of thin sheet metal—must be used. It is next to impossible to obtain a true cut, as such cutters are apt to buckle and warp even when the greatest care is taken in feeding the substance to be cut to the cutter. On the other hand, in the use of thin flexible cutters it is, I may say, impossible to adjust the same in a true horizontal plane without proper adjusting devices, in order to adjust the substance so that the cutting will be effected at the proper point and in the desired plane; nor is it possible to predict what course the cutter will pursue in the process of cutting after penetrating into the substance. It is, however, safe to say that such a cutter will materially deviate from a true or from a desired plane.

To obviate these difficulties I have devised a cutter leveling device and guide, which I will now describe, reference being had more particularly to Figs. 9, $9^a$, $9^b$, $9^c$, $9^d$, and $9^e$. The leveling device and guide, which for the purposes of this description I will call the "cutter-guide," is vertically adjustable on a standard K, which may be firmly bolted to the table T; but as a matter of convenience, in order that the guide may be moved out of the way when not needed—that is to say, when cutters are used that are sufficiently rigid, so as not to need a guide—I prefer to secure the standard K to a base $k$ of lead or cast-iron sufficiently heavy, so as not to be materially influenced by the vibration or jarring of the table due to the operation of the cutter. The base $k$ is preferably heart-shaped and is provided with leveling-screws $k'$ for obvious purposes. In order to avoid the use of a too heavy base, I prefer to weight the same by means of a block of lead $k^2$, provided with a recess or slot $k^3$, so as to fit around the spirit-level K', as shown in dotted lines in Fig. 9, or said weight may be provided with feet to hold it above the level K'. The stability of the cutter-guide will necessarily depend upon the length of its base as well as upon the weight thereof, and due regard should be had to the making of said base of proper length and giving it sufficient weight to insure the necessary stability of the cutter-guide, which must be supported in the plane to which it is adjusted as well as in a true horizontal plane; otherwise its function for delicate work will be impaired. In order to properly level the cutter-guide support, I preferably use two spirit-levels K' $K^2$, arranged at right angles to each other, as shown in Fig. 9. The standard is a polished cylindrical steel bar, and has adjustably secured thereto by means of set-screws $k^4$ a collar or sleeve $K^4$, that serves as a support for a tubular bearing $l$, to which is secured by means of screws the lower arm L of the cutter-guide. A second collar $K^5$, adjustably secured on the tubular bearing $l$ by means of a set-screw $k^5$, serves as a support for the bearing $l'$, that carries the upper arm L' of the cutter-guide, which is held against vertical displacement by a screw $l^2$, that screws into the standard. The bearing $l'$ for the upper arm L' of the guide is preferably constructed in the form of a split tube or sleeve and provided with ears, so that it may be securely clamped to the standard K by means of one or more screws passing through said ears. The arms $l\,l'$ are of equal length—that is to say, their outer or free ends lie in the same vertical plane—and, as shown in Fig. 9, they have each a heel $l^{10}$, the bearing-faces of which may be concave to fit their tubular bearings. If desired, the said tubular bearings may be provided with plane or squared bearing-surfaces, and the arms L and L' with a corresponding heel formed at right angles thereto, as shown in Fig. $9^b$. The tubular bearings for the cutter-guide arms should be fitted to the standard with such nicety as to preclude any vibration or vertical rocking motion, as will be readily understood. By means of the construction described it will be seen that by revolving the lower arm L the upper arm L' will also revolve, while either arm may be revolved independently, and the upper arm L' may be adjusted vertically upon the tubular bearing $l$, or both arms may be simultaneously adjusted on the standard. At the outer or free end the arms L L' are provided with a journal-bearing $l^3$ for the journal or spindle $m$ of the curvilinear guide-arms M M', respectively, which journals are secured to a bridge $m'$, screwed to said arms M and M'. The spindles $m$ are held in their bearings so as to revolve freely by means of a nut $m^2$ and washer $m^3$. The bearing on the lower arm M may be a socket-bearing. These cutter-guide arms M M' may, however, be connected to the arms L and L', respectively, in any other desired manner. For instance, the journal $m$ may be rigidly secured to its arm, passing through a hole formed in an enlargement $m^4$ of the arm M, and held in its journal-bearing by means of a screw and washer, Fig. $9^a$, a collar $m^5$ being preferably interposed between the journal-bearing $l^3$ and the arm M'. The enlargement $m^4$ on arm M is, however, objectionable, in that it reduces to the extent of the enlargement the working distance of the guide—that is to say, the distance to which it can be moved toward the axis of the cutter when such small cutters or laps as eight-inch cutters or laps are used in cutting from a moderately large specimen or substance. This is avoided by the construction shown and described in reference to Fig. $9^c$, and this also admits of the use of a central leveling and guide wheel, hereinafter referred to, and of the vertical adjustment of said wheel. On the other hand, the spindle $m$ may be secured to the cutter-guide arm M or M', so as to project centrally therefrom, thereby also avoiding the enlargement on the inner face of said arms; but this will necessitate the use of two center leveling and guide wheels, one on each side of the spindle, which is also undesirable. This is, however, avoided by the construction shown and described in reference to Fig. 9, and instead of said construction that shown in Fig. $9^c$ may be adopted. As shown in the last-named figure, the lower end of the spindle $m$ is made tubular for the reception of the spindle $m^{31}$ of the wheel $M^2$ and for the vertical adjustment of said spindle by means of the set-screw $m^6$. The spindle $m$ in this case is screwed into the curvilinear arm M or M', as shown in dotted lines in said Fig. $9^c$. In order that the vertical adjustment of the friction-wheel $M^2$ may be more readily effected, the tubular portion of the spindle $m$ above the curved arm may be provided with diametrically-opposite finger-slots $m^7$, as shown. The cutter-guide arms M and M' are connected with their supporting-arms L and L' so as to lie between said supporting-arms and the cutter or lap and should be free to revolve on their spindles $m$. When the arms M and M' have been adjusted to level the cutter or lap and guide the same, the rotation of said arms on their spindles by the frictional contact between the guide-wheels and the cutter or lap may be prevented by tightening the spindle-nut $m^2$ or by means of a set-screw $m^8$, extending through the socket-bearing $l^3$ on arm L. (Shown in dotted lines in Fig. 9.) If desired, a thin washer may also be interposed between the bridge $m'$ and the bearing $l^3$ to increase the frictional contact between said parts and prevent the displacement of the guide-arms when moved to or from the lap.

If the dimensions of the cutters or laps used vary considerably, I prefer to use several pairs of interchangeable guide-arms M M', the curvature of each of which will then be a segment of a circle described by the smallest cutter of any set of such; but when the diameter of the cutters or laps used varies but slightly one set of guide-arms can be used with all of them, as the said guide-arms are provided with extensible supports for some of the roller-bearings, which may thus be adjusted for and with cutters whose diameter varies within the limits of the adjustability of the extension-arms. As shown in Fig. 9, the arms M and M' are each provided with five wheels $M^2$, of which three are directly connected with said arms and two are adjustably connected therewith at the outer ends. The intermediate wheels are arranged at equal distances from one another, the central one being preferably in the axis of rotation of its supporting-arm. The wheel next to the outer one has its bearings in one of two slotted extension-arms $M^3$ $M^4$, adjustably connected together by a screw or bolt and nut $m^9$, passing through the slots thereof, the arm $M^3$ being pivotally and adjustably connected with its guide-arm by means of a bolt and nut $m^{11}$. The outer wheel $M^2$ is pivotally and adjustably connected with the outer end of its guide-arm by means of a nut and bolt or screw $m^{21}$ extending through said guide-arm and the slot of arm $M^5$. The spindles of all the wheels are preferably so connected with their supports as to revolve freely to permit the wheels to align themselves in the direction of rotation of the cutter or lap, against the opposite faces of which said wheels bear. The arms M M' are so arranged that their wheels will bear against the cutter on the cutting side—that is to say, on that side of the cutter at which the substance to be cut is presented to maintain the cutter in a true plane—and the said guide-arms are moved by the substance being cut toward the axis of rotation of the cutter as the latter penetrates into said substance. The object of the extension-arms for the outer wheels or casters $M^2$ is an obvious one, and by these means a much greater area of the cutter will be subjected to the guiding and leveling action of said wheels. On the other hand, in cutting large specimens the wheels can be maintained on both sides of the said specimen throughout the cutting.

The leveling and guide wheels $M^2$ may be constructed of steel or agate or other hard substance and should be so connected with their cutter-guide arms as to be adjustable vertically therein—as, for instance, by the means hereinbefore described—so as to afford an independent adjustment as regards the wheels themselves and also as regards the supporting-arms L L', which is necessary for precise leveling.

Although the wheel-spindles $m^{31}$ may be arranged so as not to revolve in their bearings, yet this will involve the setting of the wheels in the direction of rotation of the cutter in order to avoid too great a friction, and for this purpose I prefer to arrange the wheel-spindles relatively to their bearings, so as to revolve freely in the latter, thereby providing a self-adjustment of the wheels in the direction of rotation of the cutter or lap. This construction is shown in Fig. $9^d$, in which $m^{31}$ is the wheel-spindle, provided in its end with a screw-threaded socket for the reception of the locking-screw $m^{10}$, the spindle being contained in a sleeve-bearing $m^{12}$, so as to revolve freely therein, and is locked thereto by the screw $m^{10}$ and a washer $m^{14}$, interposed between sleeve $m^{12}$ and the forked bearing on the spindle. The caster as constructed is inserted in its bearing or in the cutter-guide arms M or M' and may be adjusted vertically by means of set-screws $m^8$ impinging upon the sleeve-bearing $m^{12}$, thus allowing the spindle and wheel to revolve freely without permitting endwise motion of said spindle, which is necessary in order to maintain the cutter in the plane to which it has been adjusted, as will be readily understood. In the cutting of small sections with small cutters the extension-arms and their wheels may be removed or turned out of the way.

In the operation of cutting, the frictional contact between the wheels $M^2$ and the cutter may move the cutter-guide away from the substances to be cut. This I avoid by connecting the lower arm L of the guide with the adjusting-screw $D^4$, that serves to adjust the work-holder on its support D by means of a cord or chain $M^6$, Fig. 9. In this manner the leveling and guiding devices are moved with the work-holder toward the axis of the cutter as the cutting proceeds. It is of course necessary that the cutter-guides be adjusted in a true horizontal plane, and if the said guide is properly constructed this adjustment can be readily effected, and to insure proper adjustments a surface-gage, such as the Starrett surface-gage, may be used.

When a gang of cutters is used, as hereinbefore set forth, they may be arranged as already described and leveling and cutter guides used in conjunction therewith, and said devices may vary in their construction and arrangement according to the thickness of the slabs to be cut or the nature of the cutters used, and these devices I will now describe.

Referring to Figs. 10, 10$^a$, 11, 11$^a$, 12, 12$^a$, and 12$^b$, to the lower arm L on standard K of the leveling devices is detachably secured a horizontal rod or bar $q$ by means of a nut $q'$, the outer end of said rod being screw-threaded for this purpose. That portion of the rod which passes through the arm L is attenuated to form a suitable stop-shoulder that bears against the inner face of the arm L. The rod $q$ carries a sleeve $q^2$, that is adjustable by means of a binding or set screw $q^4$, and said sleeve has formed thereon a vertical sleeve $q^3$ for a rod $q^5$, that is vertically adjustable in said sleeve by means of a set-screw $q^6$. The upper end of rod $q^5$ is enlarged and has a screw-threaded socket for the reception of a clamping-screw $q^7$, by means of which the leveling and guide arm Q is adjustably secured to the rod $q^5$, said arm Q having its shank slotted at Q'. The cutter-guide portion of the arm is curvilinear, like the arms M and M', and is of the thickness of the slab or tablet to be cut, and substantially fills the space between two cutters. The curvilinear portion Q$^2$ of the arm Q should be highly polished to avoid friction and should at all times be well lubricated during the operation of cutting. By means of one such arm Q two cutters can be employed and maintained in a true horizontal plane in conjunction with the cutter-guide hereinbefore described, and by providing a similar arm Q for the upper supporting-arm L' and depending therefrom three cutters can be used leveled and maintained in a true horizontal position in conjunction with said cutter-guide. The curvilinear portion Q$^2$ of the cutter-guide arm Q should be of sufficient width to enable it to resist without bending the thrust and friction of the cutters in cutting very thin sections. In cutting thicker sections the thickness of the said curvilinear portion Q$^2$ of arm $q$ will be of increased thickness, and consequently of increased strength, so that its width can be correspondingly reduced.

In order to maintain the cutters in a proper horizontal plane after the cutter-guide arm is moved away from the cutting-edge of the substance cut, I employ an adjustable arm Q$^3$, pivoted at $q^8$ to the shank of arm Q, said arm Q$^3$ consisting of two arms $q^{13}$ $q^{23}$, pivotally connected together, as shown in Fig. 10, the arm $q^{23}$ being of a thickness equal to the space between the cutting-edges on one side of the substance to be cut, thus maintaining that portion of the cutters which has penetrated into the substance in a true horizontal plane. The arm Q$^3$ is applied on one side of the substance being cut, and in order that the cutters may be likewise kept level at the opposite or outer side I employ a rim-guide such as shown in Fig. 12, or preferably such as shown in Figs. 12$^a$ and 12$^b$.

It has hereinbefore been stated that in the cutting of small sections the cutter-guide may be removed or turned out of the way. If the cutter used is a very thin one, it is liable to warp or buckle, and this I avoid by using a rim-guide such as shown in Fig. 12, which consists of a standard N', secured to a heavy base-plate N$^2$ to insure its stability, said standard carrying a sleeve $n'$, adjustable thereon by means of a set-screw $n^{21}$. The sleeve $n'$ has an arm $n$, that is forked, and in said fork are journaled two cutter-disks N N, spaced according to the thickness of the cutter used by the interposition of a washer $n^2$. Such a rim-guide is applied at the rim or periphery of the cutter on either one or both sides of the substance to be cut to maintain said cutter in a true horizontal plane. In cutting large sections this rim-guide may be used in conjunction with the cutter-guides above described, though I prefer to use the rim-guide shown in Figs. 12$^a$ and 12$^b$, as above set forth. This rim-guide is constructed substantially like that shown in Fig. 12, except that the arm $n$ is constructed of two parts hinged together at $n^3$, so that the outer section $n^4$ can swing vertically, and that there is but one leveling-disk N used, of a thickness equal to the space between two cutters. The hinge-pintle is a binding-screw $n^5$, so that the section $n^4$ is not only detachably connected with arm $n$, but may also be rigidly secured thereto when adjusted. This construction provides an additional adjustment, the advantages of which will be readily comprehended. The thickness of the disk N varies with the thickness of the sections to be cut, and, as is the case with the cutter-guides Q, a set of such disks will be provided that are interchangeably connected with their support. This rim-guide may also be used in lieu of the articulated arm Q$^3$, as and for the purposes above described.

Another excellent gang-cutter guide is shown in Figs. 11 and 11$^a$, in which the cutter-guide is composed of a curvilinear thin strip of sheet metal U, such as tin, to the outer periphery of which are secured guide-plates U' in any convenient or desired manner, of the desired or required thickness, said plates being either riveted, soldered, or otherwise secured to the curvilinear strip U, which last-named strip may be made in two sections, Fig. 11$^a$, rigidly secured together by wire staples. At each end of the curved strip U is attached a wire $u$, adapted to be tied to a vertical rod $u'$, adjustably secured in a sleeve $u^2$ at the outer end of an arm U$^2$, that is provided with a collar $u^3$, adapted to fit on the bearings $l^3$ at the outer end of the arm L', said arms U$^2$ being secured to said bearing by means of a set-screw $u^4$, Fig. 11.

The supporting-rods $u'$ for the cutter-guide plate U may be adjusted in the sleeve-bearings $u^2$ in any desired manner, either by means of a binding-screw $u^5$ or by employing a split sleeve-bearing in which the rods are held sufficiently tight to prevent displacement.

It will be seen that by the construction of cutter-guide just described and the means for connecting the same to the supporting-arm L' said devices may be readily and accurately adjusted to maintain the cutters in a perfectly-horizontal plane and prevent their buckling or warping, no matter how thin these cutters may be. On the other hand, the cutter-guide U will move with the supporting-arm L' as the cutters penetrate into the substance. In conjunction with these devices the rim cutter-guide above described is or may also be used on one or both sides of the substance to be cut after the cutters have penetrated into the substance so far as to have moved the cutter-guide U some distance from the periphery of the said cutters, as will be readily understood.

Any suitable means may be provided for supplying a lubricant to the cutters—as, for instance, the means shown in Fig. 1, in which O indicates a reservoir containing the lubricant, to which is connected the flexible delivery-pipe $o$, which is adjusted to position by means of a hooked rod $o'$, adjustably secured beneath a block $o^2$, a pinch-cock $o^3$ of well-known construction and operation being preferably used to regulate the supply of lubricant.

When a gang of cutters is used, a plurality of delivery-pipes $o$ may be used and adjusted to supply the lubricant to the several cutters. I prefer, however, to form a number of perforations I' in all of the cutters I except the lower one, (see Figs. 10, 10ª, and 11,) the perforations on the cutters being arranged in different planes, so that the lubricant will not pass directly from the upper to the lower cutter, but will be distributed by centrifugal action as it drops from cutter to cutter to the cutting-edges thereof.

Having now described my invention, what I claim is—

1. In a machine for cutting or slicing minerals, the combination of the following instrumentalities: a horizontally-revoluble discoidal cutter and a work-holder support in the plane of rotation of the cutter and adapted to be adjusted in a right line and in a circle at right angles to said plane of rotation of the cutter, for the purpose set forth.

2. In a machine for cutting or slicing minerals, the combination of a horizontally-revoluble discoidal cutter and a work-holder support in the plane of rotation of the cutter, adapted to revolve about vertical and horizontal axes and adjustable along said vertical axis, for the purpose set forth.

3. In a machine for cutting or slicing minerals, the combination of a horizontally-revoluble discoidal cutter, a work-holder support in the plane of rotation of the cutter and adapted to be adjusted in a rectilinear and a circular plane at right angles to said plane of rotation of the cutter, and a work-holder connected with and adjustable longitudinally of said support, for the purpose set forth.

4. In a machine for cutting and slicing minerals, the combination, with a cutter, of a work-holder support adapted to be adjusted in a plane at right angles to the plane of motion of the cutter, as well as in a circular plane, and a work-holder connected with and adapted to be adjusted on the support in the plane of motion of the cutter and about its own axis, substantially as set forth.

5. In a machine for cutting or slicing minerals, the combination of a horizontally-revoluble discoidal cutter, a work-holder support in the plane of rotation of the cutter and adapted to be adjusted in a right line and in a circle at right angles to the said plane of rotation of the cutter, and a revoluble work-holder connected with and adjustable longitudinally of said support, for the purpose set forth.

6. In a machine for cutting or slicing minerals, the combination of a horizontally-revoluble discoidal cutter, a work-holder adapted to revolve about horizontal and vertical axes and adjustable along the latter axis, and a revoluble work-holder connected with and adjustable longitudinally of said support, for the purposes set forth.

7. In a machine for cutting or slicing minerals, the combination of a horizontally-revoluble discoidal cutter, a vertical revoluble standard, a sleeve adjustable vertically on the standard and provided with a horizontal bearing, a worm-spindle connected with the sleeve, a work-holder support revoluble in the horizontal bearing in the sleeve, and a worm-gear connected with said support and adapted to be revolved by the worm-spindle.

8. In a machine for cutting or slicing minerals, the combination of a horizontally-revoluble cutter, a vertical revoluble standard, a vertical revoluble adjusting-screw, a sleeve loosely mounted on the standard and having an interiorly-threaded vertical bearing for the adjusting-screw and a horizontal bearing, a worm-spindle connected with the sleeve, a work-holder support revoluble in the horizontal bearing of said sleeve, and a worm-wheel secured to said work-holder support and adapted to be revolved by the worm-spindle, for the purpose set forth.

9. In a machine for cutting or slicing minerals, the combination of a horizontally-revoluble discoidal cutter, a vertical revoluble standard, a sleeve adjustable on the standard and provided with a horizontal bearing, a worm-spindle pivotally connected with the sleeve, a work-holder support adapted to revolve in the horizontal bearing of the sleeve, and a worm-wheel secured to said work-holder and adapted to be revolved by the worm-spindle, for the purpose set forth.

10. In a machine for cutting or slicing minerals, the combination, with the work-holder support D, of a vertical revoluble standard, a locking device adapted to lock the standard against revolution, a sleeve-bearing adapted to be adjusted vertically on the standard, a locking device to lock the said bearing against such vertical motion, a worm-gear connected, respectively, with the sleeve-bearing and the support, and a locking device for locking the worm-gear against operation, substantially as and for the purposes specified.

11. In a machine for cutting or slicing minerals, the combination, with the work-holder support D, of a vertical revoluble standard, a locking device adapted to lock the standard against revolution, a sleeve-bearing adapted to be adjusted vertically on the standard, a locking device to lock the said bearing against such vertical motion, a worm-gear connected, respectively, with the sleeve-bearing and the support, and a locking device for locking the worm-gear against operation, the said parts being detachably connected together, substantially as and for the purposes specified.

12. In a machine for cutting or slicing minerals, the combination of the sleeve-bearing $B^2$, provided with a cylindrical boss, a bearing secured to the periphery of the boss, a worm, and a sleeve-bearing therefor, said sleeve-bearing being provided with a journal adapted to revolve in the bearing on the cylindrical boss, with a worm-wheel adapted to be engaged by the worm, and a work-holder support connected with the worm-wheel, substantially as and for the purposes set forth.

13. In a machine for cutting or slicing minerals, the combination of the work-holder support D and a carriage mounted on and adjustable lengthwise of the support with a work-holder pivotally connected with the carriage and adjusting-gearing for imparting rotary motion to the work-holder, for the purposes set forth.

14. In a machine for cutting or slicing minerals, the combination of the work-holder support D and a carriage mounted on and adjustable lengthwise of the support with a work-holder pivotally connected with the carriage, adjusting-gearing for imparting rotary motion to the work-holder, and a locking device for locking the gearing against operation, for the purposes set forth.

15. In a machine for cutting or slicing minerals, the combination of the work-holder support D with a work-holder, a carriage therefor adapted to be adjusted longitudinally of the support, gearing connected, respectively, with the carriage and the work-holder, and a spring-actuated brake-shoe adapted to engage the periphery of the gear connected with the work-holder and lock the same against revolution, substantially as and for the purposes set forth.

16. In a machine for cutting or slicing minerals, the combination, with the work-holder support D, a carriage mounted on and adjustable vertically of the support, and a worm-spindle having its bearings on the carriage, of a work-holder pivotally connected with the carriage, and a worm-wheel secured to the holder and adapted to be revolved by the worm-spindle, for the purpose set forth.

17. In a machine for cutting or slicing minerals, the combination of a horizontally-revoluble discoidal cutter, a work-holder support in the plane of rotation of the cutter, a carriage mounted on and adjustable lengthwise of the support, and a worm-spindle having its bearings on the carriage with a work-holder adapted to revolve on a horizontal bearing connected with the carriage, and a worm-wheel secured to the holder and adapted to be revolved by the worm-spindle, for the purpose set forth.

18. In a machine for cutting or slicing minerals, the combination, with a horizontally-revoluble discoidal cutter, a work-holder support in the plane of rotation of the cutter and adapted to revolve about vertical and horizontal axes, a carriage mounted on and adjustable lengthwise of the support, and a worm-spindle having its bearings on the carriage, of a work-holder revoluble on a horizontal bearing connected with the carriage, a worm-wheel secured to said holder and adapted to be revolved by the worm-spindle, and a spring-actuated brake adapted to engage the worm-wheel, for the purpose set forth.

19. In a machine for cutting or slicing minerals, the combination of the work-holder support D with a work-holder, a carriage therefor adapted to be adjusted longitudinally of the support, a worm connected with the carriage, a worm-wheel connected with the work-holder and in engagement with said worm for imparting rotary motion to the holder, and a spring-actuated brake-shoe adapted to engage the periphery of said worm-wheel, substantially as and for the purposes set forth.

20. In a machine for cutting or slicing minerals, the means for adjusting the work-holder about its axis, comprising an adjusting-gear, a support having a horizontal journal and a bearing for one element of the adjusting-gear, and a work-holder mounted and revoluble on said journal and provided with a bearing for the other element of the adjusting-gear, as and for the purpose set forth.

21. In a machine for cutting or slicing minerals, the means for adjusting the work-holder about its axis, comprising an adjusting-gear, a support for the work-holder, a detachable bearing for one of the elements of the adjusting-gear, the work-holder, and a bearing detachably connected with the support upon which the holder and the other element of the adjusting-gear are adapted to revolve, as and for the purpose set forth.

22. In a machine for cutting or slicing minerals, the combination of the work-holder support provided with a longitudinal guide-groove V-shaped in section with the work-holder carriage provided with a tubular bear- 23. In a machine for cutting or slicing minerals, the combination of the work-holder carriage provided with a cylindrical boss having an axial screw-threaded bearing with the work-holder plate provided with an axial opening, a journal extending through said opening and having its outer end screw-threaded and screwing into the axial opening of the carriage, a gear-wheel loosely mounted on said journal between the work-holder plate and the carriage, and gearing connected with said carriage and adapted to engage said gear-wheel, substantially as and for the purposes set forth.

24. In a machine for cutting or slicing minerals, the combination of the work-holder carriage provided with a cylindrical boss having an axial screw-threaded bearing and a cylindrical recess formed around said bearing with the work-holder plate provided with an axial opening, a journal having at one end a head and being screw-threaded at the opposite end and screwing into the bearing in the carriage, a gear-wheel secured to the work-holder plate and mounted loosely on the journal and provided with a cylindrical boss adapted to fit the corresponding recess in the carriage, and a driving-gear connected with the carriage and adapted to engage the gear-wheel, substantially as and for the purposes set forth.

25. In a machine for cutting or slicing minerals, the combination, with a horizontally-revoluble discoidal cutter, of a work-holder support in the plane of rotation of the cutter and adapted to be adjusted in said plane and in planes at right angles thereto and a work-holder comprising clamping-jaws adjustable toward and from each other, said work-holder being adjustable on the support and about its own axis.

26. In a machine for cutting or slicing minerals, a work-holder comprising a revoluble support and clamping-jaws having concave clamping-faces provided centrally with an opening $g^{16}$, connected with and adapted to be adjusted to and from each other on said support, substantially as and for the purposes set forth.

27. In a machine for cutting or slicing minerals, the combination, with the adjustable clamping-jaws of the work-holder, having concave clamping-faces provided with an opening $g^{16}$, of auxiliary clamping-jaws having a convex back provided with a dowel adapted to enter said opening $g^{16}$, substantially as and for the purposes set forth.

28. In a machine for cutting or slicing minerals, the combination, with the adjustable steel clamping-jaws of the work-holder, having concave clamping-jaws corrugated vertically and provided with an opening $g^{16}$, of auxiliary clamping-jaws of a softer material, having a convex back and provided with a dowel adapted to enter said opening $g^{16}$, substantially as and for the purposes set forth.

29. In a machine for cutting or slicing minerals, the combination, with the adjustable clamping-jaws of the work-holder, provided with an opening $g^{16}$, of auxiliary clamping-jaws having irregular clamping-faces and provided with a dowel adapted to enter the said opening $g^{16}$, substantially as and for the purposes set forth.

30. In a machine for cutting or slicing minerals, the combination, with clamping-jaws adapted to be adjusted toward and from each other, of auxiliary clamping-jaws having one of their edges beveled and provided at the opposite end with a triangular block, the beveled edge of one of the auxiliary jaws bearing against the inclined face of the triangular block of the other jaw, whereby when said auxiliary jaws are inserted between the adjustable clamping-jaws the latter as they approach each other will cause the auxiliary jaws to approach each other also, substantially as and for the purposes specified.

31. In a machine for cutting or slicing minerals, the combination, with clamping-jaws adapted to be adjusted toward and from each other, of auxiliary clamping-jaws having one of their edges beveled and provided at the opposite end with a triangular block, the beveled edge of one of the auxiliary jaws bearing against the inclined face of the triangular block of the other jaw, and a loose connection between said beveled edge of one jaw and the triangular block of the other jaw, whereby when said auxiliary jaws are inserted between the adjustable clamping-jaws the latter as they approach each other will cause the auxiliary jaws to approach each other also, substantially as and for the purposes specified.

32. In a machine for cutting or slicing minerals, the work-holder consisting of the carriage E, a supporting-plate provided with a guideway, clamping-jaws fitted on said guideway, an adjusting screw or screws working in threaded bearings formed on the clamping-jaws, a journal connected with the carriage upon which the supporting-plate for the clamping-jaws is mounted, and gearing, substantially such as described, respectively connected with the carriage and the supporting-plate for the clamping-jaws, all of said parts being detachably connected together, substantially as and for the purposes set forth.

33. In a machine for cutting or slicing minerals, the combination, with a discoidal cutter, of a cutter-guide provided with bearings adapted to revolve on their own axes and about a vertical axis, substantially as and for the purposes set forth.

34. In a machine for cutting or slicing minerals, the combination, with a discoidal cutter, of a cutter-guide provided with rolling bearings adapted to impinge upon both faces of the cutter and to move across said faces as the cutter penetrates the substance being cut, substantially as and for the purposes set forth.

35. In a machine for cutting or slicing minerals, the combination, with a revoluble discoidal cutter, of rolling cutter-guides on opposite faces of said cutter, and a support for said guides, adapted to traverse the cutter and to be adjusted in a plane at right angles thereto, for the purpose set forth.

36. In a machine for cutting or slicing minerals, the combination, with a revoluble discoidal cutter, of rolling cutter-guides on opposite faces of said cutter, and a revoluble support for said guides, adapted to traverse the cutter and to be adjusted in a plane at right angles thereto.

37. In a machine for cutting or slicing minerals, the combination, with a discoidal cutter, of a cutter-guide comprising two curvilinear arms arranged above and below the cutter and provided with rolling bearings adapted to impinge upon the faces of the said cutter, and vertical spindles for said rolling bearings, adapted to revolve in bearings in the curved arms, substantially as and for the purposes set forth.

38. In a machine for cutting or slicing minerals, the combination, with the cutter, of a cutter-guide provided with rolling bearings adapted to impinge upon opposite faces of the cutter, said rolling bearings being adjustable vertically on the guide, substantially as and for the purposes set forth.

39. In a machine for cutting or slicing minerals, the combination, with the cutter, of a cutter-guide provided with rolling bearings adapted to impinge upon opposite faces of the cutter, and revoluble spindles for said rolling bearings, adapted to be adjusted vertically on the guide, substantially as and for the purposes specified.

40. In a machine for cutting or slicing minerals, the combination, with a discoidal cutter adapted to revolve in a horizontal plane, of a cutter-guide comprising two supporting-arms adjustable and revoluble on a vertical axis, curvilinear guide-arms pivotally connected with said supporting-arms, and rolling bearings connected with the curvilinear arms and adapted to engage both faces of the cutter, substantially as and for the purposes set forth.

41. In a machine for cutting or slicing minerals, the combination, with a discoidal cutter adapted to revolve in a horizontal plane, of a cutter-guide comprising two supporting-arms adjustable and revoluble on a vertical axis, curvilinear guide-arms pivotally connected with the supporting-arms, and rolling bearings connected with and adapted to be vertically adjusted on said arms, substantially as and for the purposes specified.

42. In a machine for cutting or slicing minerals, the combination, with a discoidal cutter adapted to revolve in a horizontal plane, of a cutter-guide comprising two supporting-arms adjustable and revoluble on a vertical axis, curvilinear guide-arms pivotally connected with the supporting arms, rolling bearings, and revoluble spindles therefor connected with and adapted to be vertically adjusted on said arms, substantially as and for the purposes specified.

43. In a machine for cutting or slicing minerals, the combination, with a cutter, of an extensible cutter-guide adapted to impinge upon the opposite faces of said cutter, substantially as and for the purposes set forth.

44. In a machine for cutting or slicing minerals, the combination, with the curvilinear guide-arms of the cutter-guide and the rolling bearings connected therewith, of extensible arms pivotally connected with the curvilinear arms and carrying roller-bearings, substantially as and for the purposes set forth.

45. In a machine for cutting or slicing minerals, the combination, with the curvilinear guide-arms of the cutter-guide and the rolling bearings connected therewith, of extensible arms pivotally connected with the curvilinear arms and carrying rolling bearings adapted to be adjusted vertically in said arms, substantially as and for the purposes set forth.

46. In a machine for cutting or slicing minerals, the combination, with a discoidal cutter adapted to revolve in a horizontal plane, of an adjustable cutter-guide adapted to impinge upon the faces of the cutter and to sweep across the same as it penetrates into the material being cut, and a rim-guide adapted to impinge upon both faces of the cutter at the periphery, substantially as and for the purposes set forth.

47. In a machine for cutting or slicing minerals, the combination, with a discoidal cutter adapted to revolve in a horizontal plane, of an adjustable cutter-guide adapted to impinge upon both faces of the cutter and to sweep across the same as it penetrates into the material being cut, and a rim-guide provided with rolling bearings adapted to impinge upon both faces of the cutter at the periphery, substantially as and for the purposes set forth.

48. In a machine for cutting or slicing minerals, the combination, with a gang of discoidal cutters, of a cutter-guide of curvilinear form arranged between two cutters and adapted to be adjusted in a plane at right angles to the cutters and to sweep across the cutter-faces from the periphery to the axis thereof, said cutter-guide being of a thickness substantially equal to the space between two cutters, substantially as and for the purposes set forth.

49. In a machine for cutting or slicing minerals, the combination, with a gang of discoidal cutters and a cutter-guide of curvilinear form arranged between two cutters, of cutter-guides for the end cutters of the gang, provided with rolling bearings arranged to impinge upon the outer faces of said end cutters, substantially as and for the purposes set forth.

50. In a machine for cutting or slicing minerals, the combination, with a gang of discoidal cutters and adjustable guides provided with rolling bearings impinging upon and adapted to traverse the outer face of the end cutters of the gang, of adjustable cutter-guides arranged between the cutters of the gang and having a traversing motion across the faces thereof, for the purpose set forth.

51. In a machine for cutting or slicing minerals, the combination, with a gang of discoidal cutters and adjustable guides provided with rolling bearings impinging upon and adapted to traverse the outer face of the end cutters of the gang, of guides arranged between the cutters of the gang, comprising a segmental plate U, having plates U' secured to its periphery of a thickness equal to the space between the cutters, for the purpose set forth.

52. In a machine for cutting or slicing minerals, the combination, with the cutter or cutters, the horizontal arm L of the cutter-guide, and the work-holder carriage-support D, of a connection between said arm and the support D, substantially as and for the purposes set forth.

53. In a machine for cutting or slicing minerals, the combination, with the cutter or cutters, the horizontal arm L of the cutter-guide, and the work-holder carriage-support D, of an adjustable connection between said arm and the support D, substantially as and for the purposes set forth.

54. In a machine for cutting or slicing minerals, the combination, with a cutter and the work-holder, of a supporting-block for the material to be cut, auxiliary clamping-jaws adapted to co-operate with the jaws of the work-holder to clamp the block, and a glass plate to which the substance to be cut is cemented, adapted to be supported on the block and clamped thereto by the auxiliary clamping-jaws, substantially as and for the purposes set forth.

55. In a machine for cutting or slicing minerals, the combination, with the cutter-spindle and its bearing-standard S', provided with bearings $s'$ $s$, of the adjustable collars $S^2$ $S^3$ and the sleeve $S^4$, substantially as and for the purposes set forth.

In witness whereof I have hereunto set my hand this 5th day of September, 1890.

WILLIAM B. DWIGHT.

In presence of—
  W. L. DEAN,
  CHARLES A. MAXON.